US012291037B2

(12) United States Patent
Naruse

(10) Patent No.: US 12,291,037 B2
(45) Date of Patent: May 6, 2025

(54) CONTROL METHOD EXECUTED IN INFORMATION PROCESSING APPARATUS, INFORMATION PROCESSING SYSTEM, AND NON-TRANSITORY COMPUTER READABLE STORAGE MEDIUM

(71) Applicant: CANON KABUSHIKI KAISHA, Tokyo (JP)

(72) Inventor: Taketomo Naruse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 17/978,276

(22) Filed: Nov. 1, 2022

(65) Prior Publication Data

US 2023/0147163 A1 May 11, 2023

(30) Foreign Application Priority Data

Nov. 10, 2021 (JP) ................................ 2021-183632

(51) Int. Cl.
*B41J 2/175* (2006.01)

(52) U.S. Cl.
CPC ....... *B41J 2/17566* (2013.01); *B41J 2/17546* (2013.01); *B41J 2002/17573* (2013.01)

(58) Field of Classification Search
None
See application file for complete search history.

(56) References Cited

U.S. PATENT DOCUMENTS

2020/0330675 A1* 10/2020 Wolfgramm ........ A61M 1/3607
2021/0129551 A1* 5/2021 Mizutani .............. B41J 2/17509
2022/0364897 A1* 11/2022 Schlack .................. F04B 9/045

FOREIGN PATENT DOCUMENTS

EP 3997338 B1 * 6/2024 ............ A47J 31/402
JP 2019-177568 A 10/2019

OTHER PUBLICATIONS

Schlack, Machine TranslationofEP-3997338-B1, 2020 (Year: 2020).*

* cited by examiner

*Primary Examiner* — Scott A Richmond
(74) *Attorney, Agent, or Firm* — Venable LLP

(57) ABSTRACT

An object is to manage the remaining amount of liquid of a specific liquid container. A control method executed in an information processing apparatus including an image-capturing unit is characterized by: obtaining a captured image of a liquid container which is acquired by capturing an image using the image-capturing unit; obtaining a first identifier for uniquely identifying the liquid container from the captured image; identifying a remaining amount of liquid in the liquid container, based on the captured image; and transmitting the first identifier and the remaining amount of liquid to an external apparatus.

31 Claims, 18 Drawing Sheets

CONTROL METHOD EXECUTED IN INFORMATION PROCESSING APPARATUS, INFORMATION PROCESSING SYSTEM, AND NON-TRANSITORY COMPUTER READABLE STORAGE MEDIUM

BACKGROUND

Field of the Disclosure

The present disclosure relates to a control method executed in an information processing apparatus, an information processing system, and a non-transitory computer readable storage medium.

Description of the Related Art

In recent years, there has been a demand for a technology for informing the user of the amount of ink remaining in an ink bottle (hereinafter referred to as the "remaining amount of liquid").

Japanese Patent Laid-Open No. 2019-177568 discloses a system that analyzes image data obtained by capturing an image of an ink bottle to derive the remaining amount of liquid in the ink bottle.

However, the system according to Japanese Patent Laid-Open No. 2019-177568 merely derives the remaining amount of liquid by capturing an image of an ink bottle and cannot identify the ink bottle (liquid container) whose image is captured.

Thus, an object of the present disclosure is to manage the remaining amount of liquid of a specific liquid container.

SUMMARY

To achieve the above-mentioned object, the present disclosure is a control method executed in an information processing apparatus including an image-capturing unit, which is characterized by: obtaining a captured image of a liquid container which is acquired by capturing an image using the image-capturing unit; obtaining a first identifier for uniquely identifying the liquid container from the captured image; identifying a remaining amount of liquid in the liquid container, based on the captured image; and transmitting the first identifier and the remaining amount of liquid to an external apparatus.

Further features of the present invention will become apparent from the following description of exemplary embodiments with reference to the attached drawings.

DESCRIPTION OF THE EMBODIMENTS

Hereinafter, preferred embodiments of the present invention are explained in detail with reference to the accompanying drawings. Noted that the following embodiments are not intended to limit the present invention according to the claims and that every combination of the characteristics explained in the present embodiments is not necessarily essential to the solution in the present invention.

First Embodiment

<<System Configuration>

Figure 1:
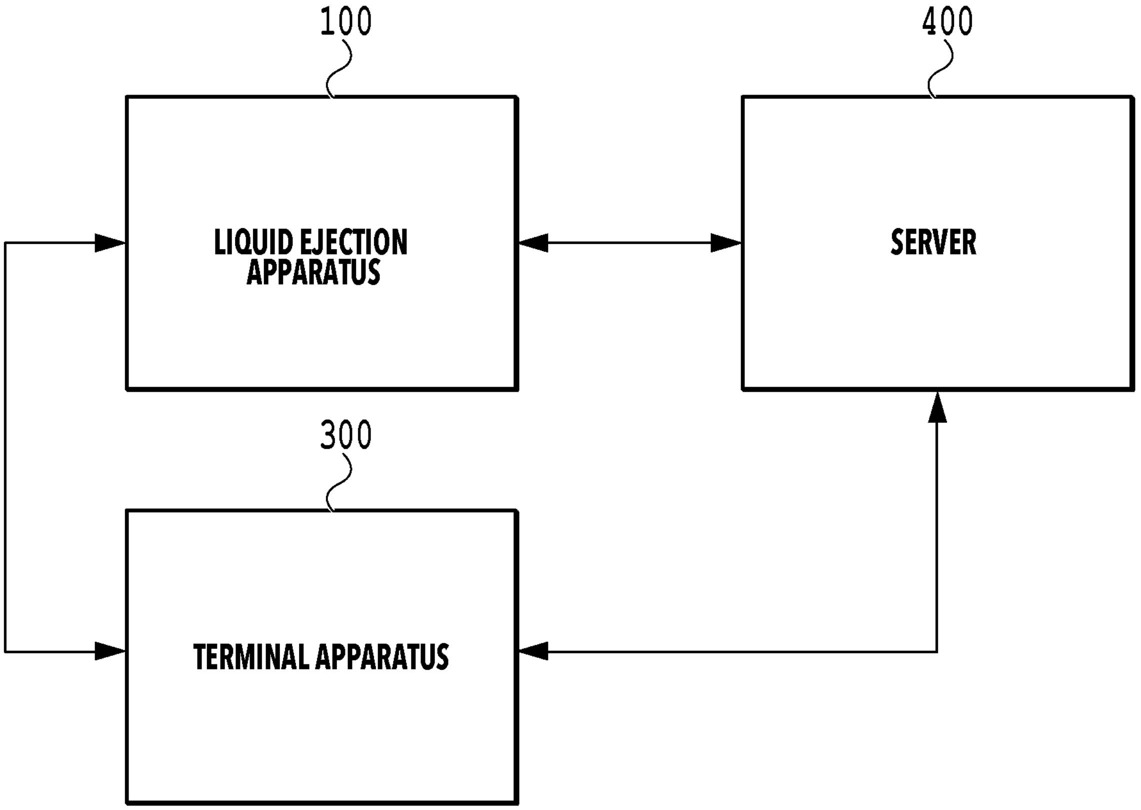
FIG. 1 is a diagram illustrating the overall configuration of an information processing system.

FIG. 1 is a diagram illustrating the overall configuration of an information processing system according to the present embodiment. The information processing system includes the liquid ejection apparatus 100, the terminal apparatus 300, and the server 400 which serves as an external apparatus that provides a cloud service via a network. The terminal apparatus 300 is connected to the liquid ejection apparatus 100 and the server 400 in a communicable manner via a network. The liquid ejection apparatus 100 is a multi-function peripheral with multiple functions such as a printing function in addition to the liquid ejection function. The terminal apparatus 300 is an example of an information processing apparatus with a function of obtaining an identifier for uniquely identifying the ink bottle 200 which is a liquid container, analyzing a captured image of the ink bottle 200, and detecting the remaining amount of liquid in the ink bottle 200. Hereinafter, an identifier for uniquely identifying the ink bottle 200 which is the liquid container is appropriately referred to as an "identifier of the ink bottle 200". The terminal apparatus 300 may take any form as long as the identifier of the ink bottle 200 can be obtained and the above-described remaining amount of liquid can be detected. Although, in the present embodiment, a smartphone equipped with a camera is taken as an example for the explanation, the terminal apparatus 300 is not limited to the example. Other examples include tablet-type personal computers, laptop computers, mobile phones, etc. The server 400 is an example of an information processing apparatus that provides a cloud service. The server 400 of the present embodiment can perform an image analysis on a captured image which is received from the terminal apparatus 300. Further, examples of the cloud service provided by the server 400 include a service in which the remaining amount of liquid in the ink bottle 200 is managed and, if the remaining amount in the ink bottle 200 falls to a predetermined value or less, a new ink bottle 200 is automatically delivered to the user. Hereinafter, the service is referred to as the "automatic delivery service" as appropriate. The configuration of the information processing system illustrated in FIG. 1 is an example and is not limited as such. For example, it is not necessary that the server 400 is configured with one server and the server 400 may be a server system including multiple servers 400. Further, each apparatus illustrated in FIG. 1 may be connected by wire instead of wirelessly. An example of wireless connection is a wireless LAN. An example of wired connection is connection using a USB cable.

<<About the Liquid Ejection Apparatus 100>>

Figure 2:
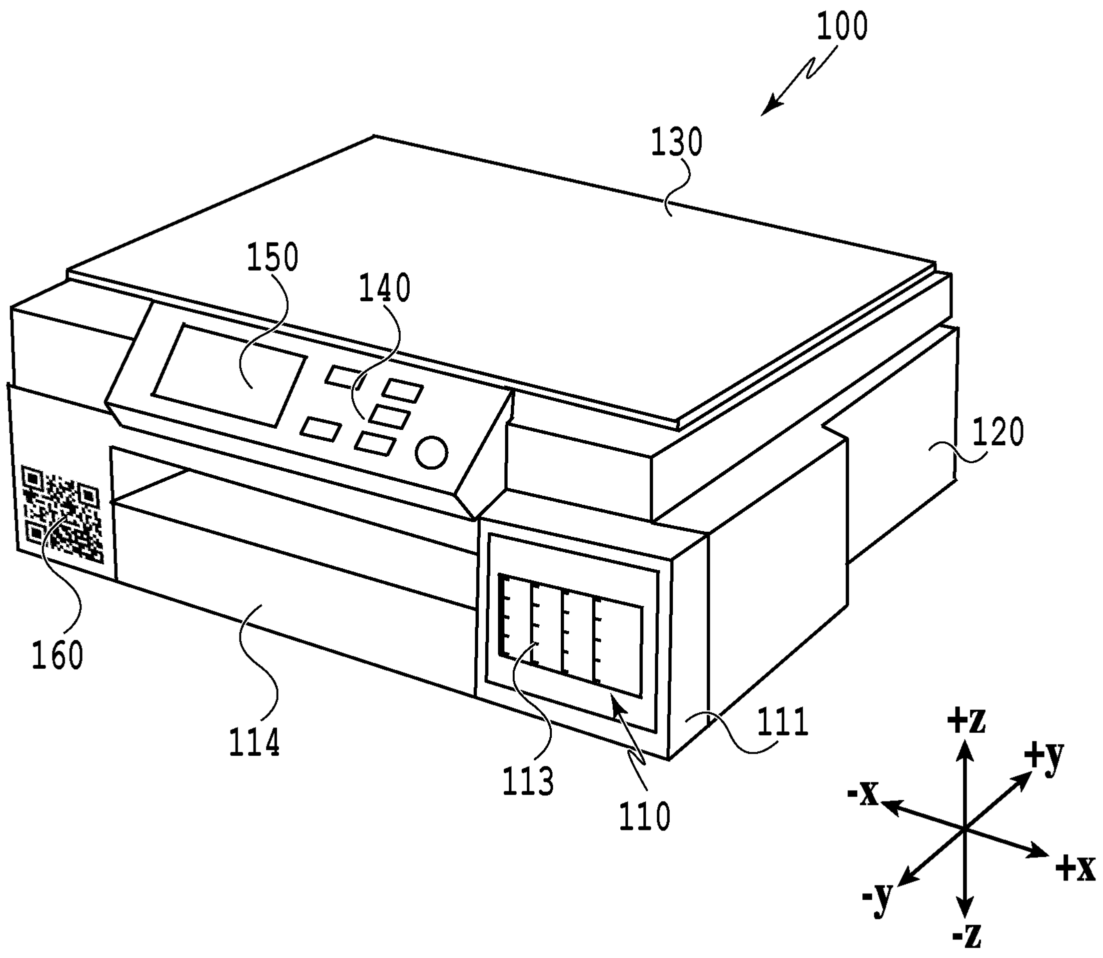
FIG. 2 is a schematic perspective view illustrating an example of a liquid ejection apparatus.

FIG. 2 is a schematic perspective view illustrating an example of the liquid ejection apparatus 100 according to the present embodiment. The liquid ejection apparatus 100 of the present embodiment is a recording apparatus. The liquid ejection apparatus 100 is an apparatus that ejects ink which is liquid. It is possible to inject liquid to the liquid ejection apparatus 100 from the outside. The liquid ejection apparatus 100 includes the recording head 301 (described later), the carriage 302 (described later) on which the recording head 301 is mounted, the ink tank unit 110, the housing 120, and the platen 130 for setting a document (for example, paper or the like). Note that the internal configuration of the liquid ejection apparatus 100 is described later with reference to FIG. 3.

The ink tank unit 110 is arranged near the front right of the liquid ejection apparatus 100. Note that the front-rear, left-right, and up-down directions referred to in the present specification are as illustrated in the respective drawings. In FIG. 2, the orientation of the liquid ejection apparatus 100 being in use is illustrated, in which the upward direction is upward in the direction of gravity, the downward direction is downward in the direction of gravity, and the left-right and front-back directions are horizontal directions. The liquid ejection apparatus 100 is equipped with the cover 111 that covers the front surface of the ink tank unit 110. The user can open the cover 111 and open the cap 112 (see FIG. 6A) of the ink tank unit 110 to insert the ink bottle 200 (see FIG. 6A) and inject liquid into the ink tank unit 110. That it, the ink bottle 200 is not always attached to the liquid ejection apparatus 100. Furthermore, the ink bottle 200 does not directly supply the liquid contained inside the liquid container unit to the recording head 301 of the liquid ejection apparatus 100. The ink bottle 200 is used to inject liquid for replenishment into the ink tank unit 110 that stores the liquid to be supplied to the recording head 301. Note that injection of liquid is described later with reference to FIG. 6A and FIG. 6B. The carriage 302 can move in the left-right direction (the X direction in FIG. 2) inside the housing 120, in order to record an image by performing scanning to the left and right while ejecting liquid on the recording medium such as paper arranged below the carriage 302 in the direction of gravity. By repeating scanning of the carriage 302 and ejection of the liquid while feeding the paper, the image is recorded on the paper surface. It is also possible that a sub-tank for temporarily storing ink is installed in the carriage 302. The paper feed tray 114 is arranged in the housing 120. Paper is supplied by the user opening the paper feed tray 114 and setting the paper. The paper is fed below the carriage 302 for recording, and the paper on which the image is recorded is discharged. The carriage 302 and the ink tank unit 110 are connected with the supply tube 311 (described later) or the like, so that liquid is supplied from the ink tank unit 110 to the carriage 302. The supply tube 311 is designed to have enough length not to damage the joining section between the carriage 302 and the supply tube 311 and the supply tube 311 itself even with the left and right scanning of the carriage 302. The housing 120 has a top surface and side surfaces. The side surfaces are surfaces that configure the housing 120 and are the surfaces that join directly or indirectly via a given member with the upper surface that configures the housing 120. The side surfaces may refer to a side surface (for example, the front surface) on which the operation unit 140 of the liquid ejection apparatus 100 or the like is arranged, the rear surface (not illustrated in the drawings) opposite to the front surface, or the surfaces on the left and right viewed from the front surface.

In the liquid ejection apparatus 100 of the present embodiment, the remaining amount display unit 113 for displaying the remaining amount of liquid is arranged on the front surface. In the example illustrated in FIG. 2, a window (opening) is formed on the front surface of the liquid ejection apparatus 100 for viewing the remaining amount of liquid in the ink tank unit 110. Accordingly, the user can recognize the remaining amount of liquid by visually checking the scale 203 (see FIG. 7) of each ink tank and the head of the liquid contained in each ink tank. Note that, as for the display method of the remaining amount display unit 113, it is also possible to increase or decrease a meter indicating the remaining amount by emitting light using an LED or the like or to place a float in the ink tank unit 110 to detect the height of the liquid surface and display the amount. Further, in a case where multiple ink tanks are arranged, the remaining amount display unit 113 may be remaining amount meters corresponding to the colors of liquid. Needless to say, the above-described meters and the like may be displayed on the display unit 150 which is arranged near the operation unit 140. The operation unit 140 is configured with a switch, a hard key, etc., for the user to perform various kinds of input operations. Further, such a form as a touchscreen, in which the display unit 150 functions as the operation unit 140 that performs input operations and the like, is also possible. The liquid ejection apparatus 100 according to the present embodiment has cyan, magenta, yellow, and black liquids. In this case, the remaining amount display unit 113 is arranged for the remaining amount of liquid corresponding to each color. In the liquid ejection apparatus 100 illustrated in FIG. 2, as an example, the scales 203 of the ink tanks of four colors and the water heads in the respective ink tanks can be seen from the remaining amount display unit 113. The display unit 150 can display various information related to the liquid ejection apparatus 100. For example, in a case where the remaining amount of liquid in the ink tank unit 110 falls to a predetermined value or less, the display unit 150 displays a message prompting the user to inject ink.

The front surface of the liquid ejection apparatus 100 according to the present embodiment is equipped with the first information holder 160 that holds information for uniquely identifying the liquid ejection apparatus 100. The first information holder 160 holds at least the identifier for uniquely identifying the liquid ejection apparatus 100 (for example, the serial ID numbered at the time of manufacture) and a destination of the server 400 that stores information related to the liquid ejection apparatus 100. Examples of the destination of the server 400 include at least one of a server ID and a URL (Uniform Resource Locator). Hereinafter, the identifier for uniquely identifying the liquid ejection apparatus 100 is referred to as the "identifier of the liquid ejection apparatus 100" as appropriate. It is also possible that the first information holder 160 further includes at least one of the information for launching a dedicated application (hereinafter referred to as a "registration app") necessary for utilizing the automatic delivery service for the ink bottle 200 and the information about the performance of the liquid ejection apparatus 100, etc. Examples of the first information holder 160 include a two-dimensional code or the like.

<<Internal Configuration of the Liquid Ejection Apparatus 100>>

Figure 3:
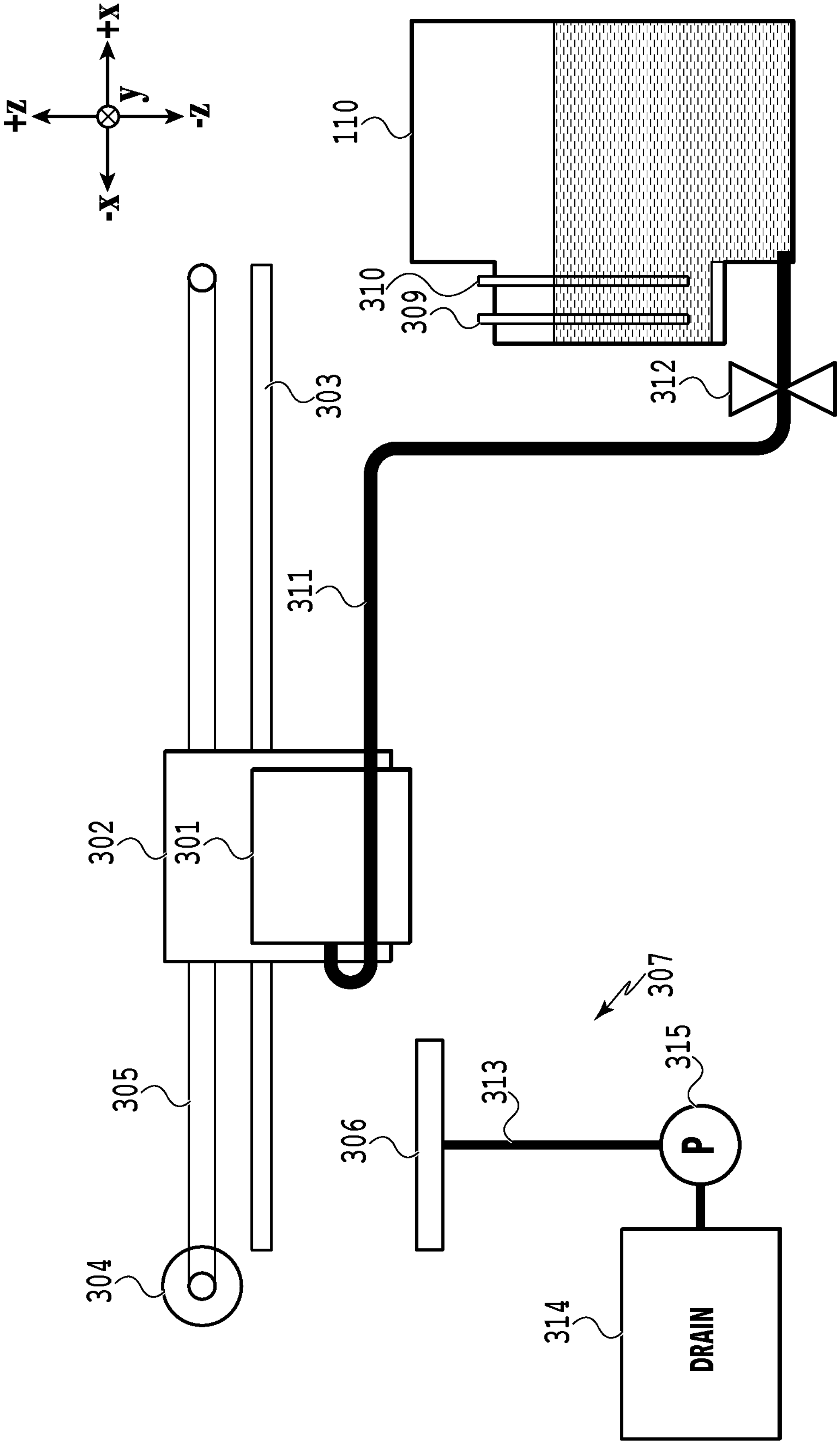
FIG. 3 is a schematic diagram illustrating the internal configuration of the liquid ejection apparatus.

FIG. 3 is a schematic diagram illustrating the internal configuration of the liquid ejection apparatus 100. Here, although the liquid ejection apparatus 100 that ejects one type of liquid is taken as an example for ease of understanding, the type of liquid ejected by the liquid ejection apparatus 100 is not limited to one type. The liquid ejection apparatus 100 includes the recording head 301 inside the housing 120 (see FIG. 2), the carriage 302 on which the recording head 301 is mounted, the cap unit 307 for performing maintenance of the recording head 301, and the above-described ink tank unit 110. The ink tank unit 110 includes the positive electrode 309 and the negative electrode 310 (that is, electrodes). The later-described CPU 401 obtains a voltage or the like which is a potential difference between the time of applying a voltage to the electrodes and the time of ending the application and compares this electrical information with a threshold value serving as a reference value, in order to determine whether or not the remaining amount of liquid in the ink tank unit 110 is equal to or less than a predetermined value. The recording head 301 is detachably mounted on the carriage 302. The carriage 302 reciprocates along the guide shaft 303 in the main-scanning direction (X direction in FIG. 3) during a recording operation. The recording head 301 moves in an integrated manner with the carriage 302 in the main-scanning direction as the carriage 302 moves. A recording medium is conveyed in the sub-scanning direction (Y direction in FIG. 3) by conveyance rollers. At the time on standby in which no recording operation is performed, the ejection openings of the recording head 301 are capped with the cap unit 307. The position where the ejection openings of the recording head 301 are capped is the standby position (that is, the home position) of the recording head 301. At the above-described home position, the cap unit 307 for performing maintenance of the recording head 301 is arranged. The cap unit 307 is equipped with the cap member 306 for protecting the ejection port surface of the recording head 301 and the suction pump 315 for creating a negative pressure in the cap member 306 to forcibly discharge ink from ejection ports. Further, the cap unit 307 is equipped with the absorber 314 and the like for storing the ink discharged via the discharge tube 313. The above-described carriage 302 reciprocates along the main-scanning direction together with the recording head 301. Specifically, the carriage 302 is movably supported along the guide shaft 303, which is arranged along the main-scanning direction, and fixed to the endless belt 305 that moves so as to be substantially parallel to the guide shaft 303. The endless belt 305 reciprocates with the driving force of the carriage motor 304, which causes the carriage 302 to reciprocate in the X direction. The supply tube 311 is used as an ink flow path. The supply tube 311 is connected to the carriage 302 and the ink tank unit 110 via the open/close valve 312 that can be opened or closed. The open/close valve 312 controls the internal pressure of the supply tube 311 at the time of suction recovery, which is performed for supplying ink to the recording head 301, so that unnecessary bubbles and foreign matters in the supply tube 311 can be removed. The supply tube 311 is formed of a material with bendability (flexibility) and is capable of supplying ink to the recording head 301 while the carriage 302 is made to reciprocate in the main-scanning direction. Note that the supply tube 311 can be connected to the recording head 301 at a given position of the recording head 301. Further, the supply tube 311 is arranged so as to have a section substantially parallel to the moving direction of the carriage 302. Note that the arrangement of the supply tube 311 is an example and is not limited as such.

Next, a method for supplying ink from the ink tank unit 110 is explained. The ink tank unit 110 is connected to the supply tube 311 with a hollow pipe. The open/close valve 312 capable of opening and closing the flow path is arranged in the supply tube 311. The open/close valve 312 is configured to open if the power of the liquid ejection apparatus 100 is turned on and to close if the power is turned off. That is, the open/close valve 312 is open during a recording operation. Noted that it is also possible that the open/close valve 312 is configured to stay being closed even after the power is turned on and to open in a case where a recording command is input to the liquid ejection apparatus 100. The ink tank unit 110 is connected with a thin tube so as to communicate with a buffer chamber. The connection position between the ink tank unit 110 and the thin tube is substantially below the ink tank unit 110, as with the connection position between the ink tank unit 110 and the hollow pipe. The buffer chamber is connected with a thin tube similar to the hollow pipe so as to communicate with the ink tank unit 110. The buffer chamber is connected to the ink tank unit 110 and is also connected to a communication pipe for opening to the atmosphere. Accordingly, the internal pressure of the ink tank unit 110 and the atmospheric pressure are balanced. Note that the thin tube connecting the buffer chamber and the ink tank unit 110 is configured to have a sufficiently narrow flow path to minimize ink evaporation in the ink tank unit 110 while allowing the ink tank unit 110 and the buffer chamber to communicate with each other.

<<Hardware Configuration of the Liquid Ejection Apparatus 100>>

Figure 4:
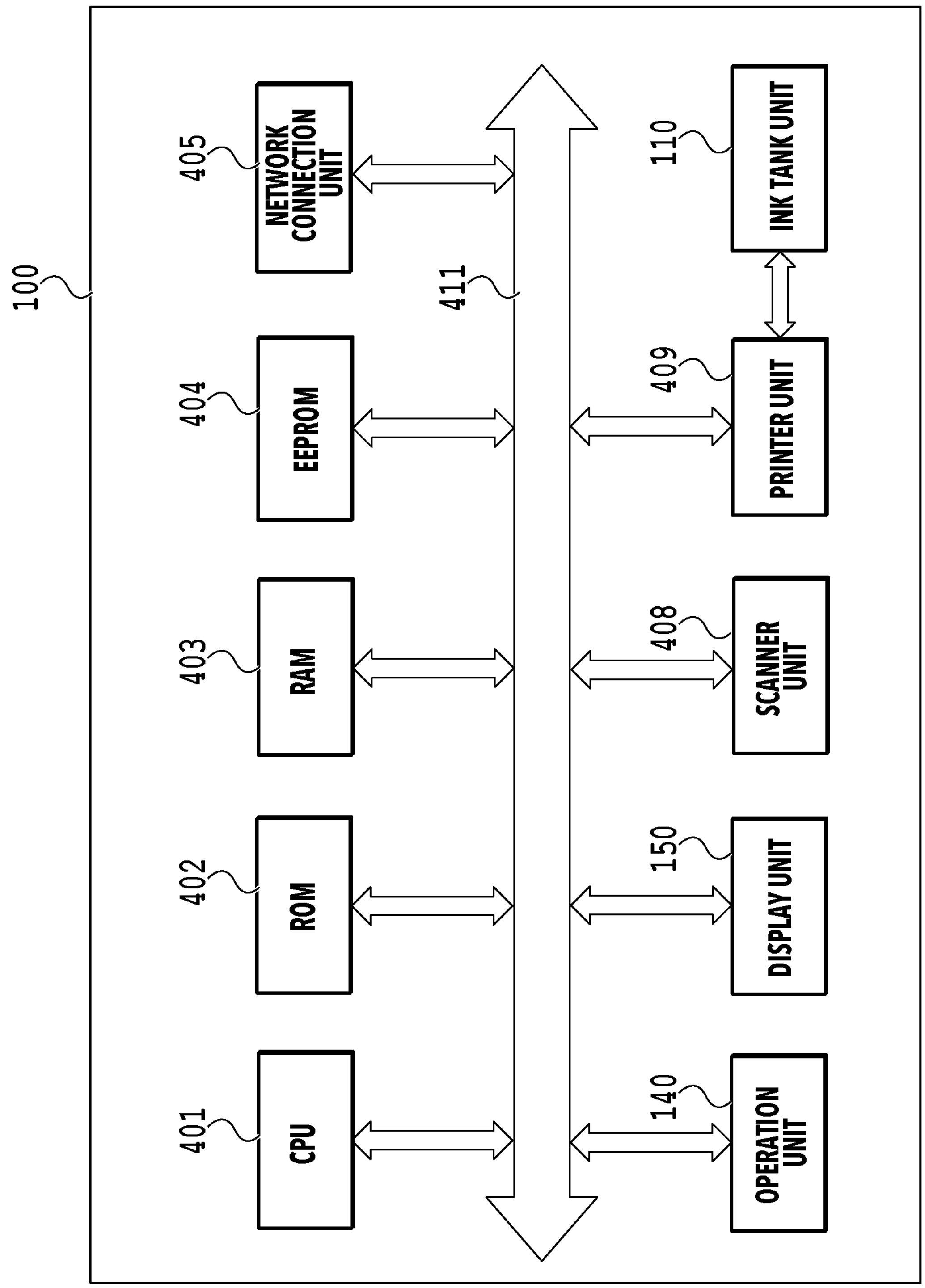
FIG. 4 is a block diagram illustrating an example of the hardware configuration of the liquid ejection apparatus.

FIG. 4 is a block diagram illustrating an example of the hardware configuration of the liquid ejection apparatus 100. The liquid ejection apparatus 100 has the CPU 401, ROM 402, RAM 403, and EEPROM 404. The CPU 401 is a central processing unit for controlling each unit in the liquid ejection apparatus 100. Various kinds of program codes are stored in the ROM 402. In the RAM 403, image data and the like are temporarily stored during execution of each service, and buffering is performed. The EEPROM 404 stores non-volatile information. The EEPROM 404 according to the present embodiment stores the ink bottle record 500, which is log information of the ink bottle 200, as non-volatile information. Note that the ink bottle record 500 stored in the EEPROM 404 is described later with reference to FIG. 5. Furthermore, as non-volatile information, it is also possible that the EEPROM 404 stores a shipping destination of the liquid ejection apparatus 100 and settings of the language displayed on the display unit 150. Further, the liquid ejection apparatus 100 has the network connection unit 405. The network connection unit 405 is connected to an external apparatus via a USB or a network. That is, the network connection unit 405 is connected to a USB or a network to communicate with an external apparatus. The RAM 403 also stores image data and the like received by the network connection unit 405. As described above, the liquid ejection apparatus 100 has the operation unit 140 and the display unit 150. The display unit 150 is configured with a liquid crystal display device, etc., for example, and is capable of displaying characters, graphics, indexes (indicators), and the like. The display unit 150 is not limited to a liquid crystal display device and can be configured using an LED or other display devices. The information displayed by the display unit 150 includes, for example, setting information for the liquid ejection apparatus 100, information related to the ink contained in the ink tank unit 110 (for example, a color and the remaining amount), etc. Furthermore, the information related to the ink includes, for example, the remaining amount of liquid in the ink bottle 200, an instruction for injecting liquid, etc. Note that the driving of the display unit 150 is controlled by the CPU 401.

Further, the liquid ejection apparatus 100 has the scanner unit 408, the printer unit 409, and the above-described ink tank unit 110. In the liquid ejection apparatus 100, the scanner function is implemented by the scanner unit 408, and the printing function is implemented by the printer unit 409. The printer unit 409 has an inkjet head, and ink is supplied from the ink tank unit 110 to the recording head 301 via the above-described supply tube 311. Further, the printer unit 409 prints an image on a recording medium such as a print sheet in an inkjet scheme, based on image data received from the outside, image data read from the scanner unit 408, or the like. Furthermore, the printer unit 409 manages ink information of the ink tank unit 110 including a remaining amount of liquid as well as sheet information including information about the number of loaded sheets. The scanner unit 408 optically reads a document that is set on the platen 130 and converts the document into digital data. Further, the scanner unit 408 transmits image data, which is converted into a designated file format, to an external apparatus via a network and stores the image data in a storage area such as an HDD. Further, in order to implement the copying function, image data which is generated by reading a document that is placed on the platen 130 with the scanner unit 408 is transferred to the printer unit 409, and, based on the image data, the printer unit 409 records an image on a recording medium. The above-described units are connected to each other via the bus 411, so that it is possible to send and receive data to and from each other.

<<Ink Bottle Record 500>>

Figure 5:
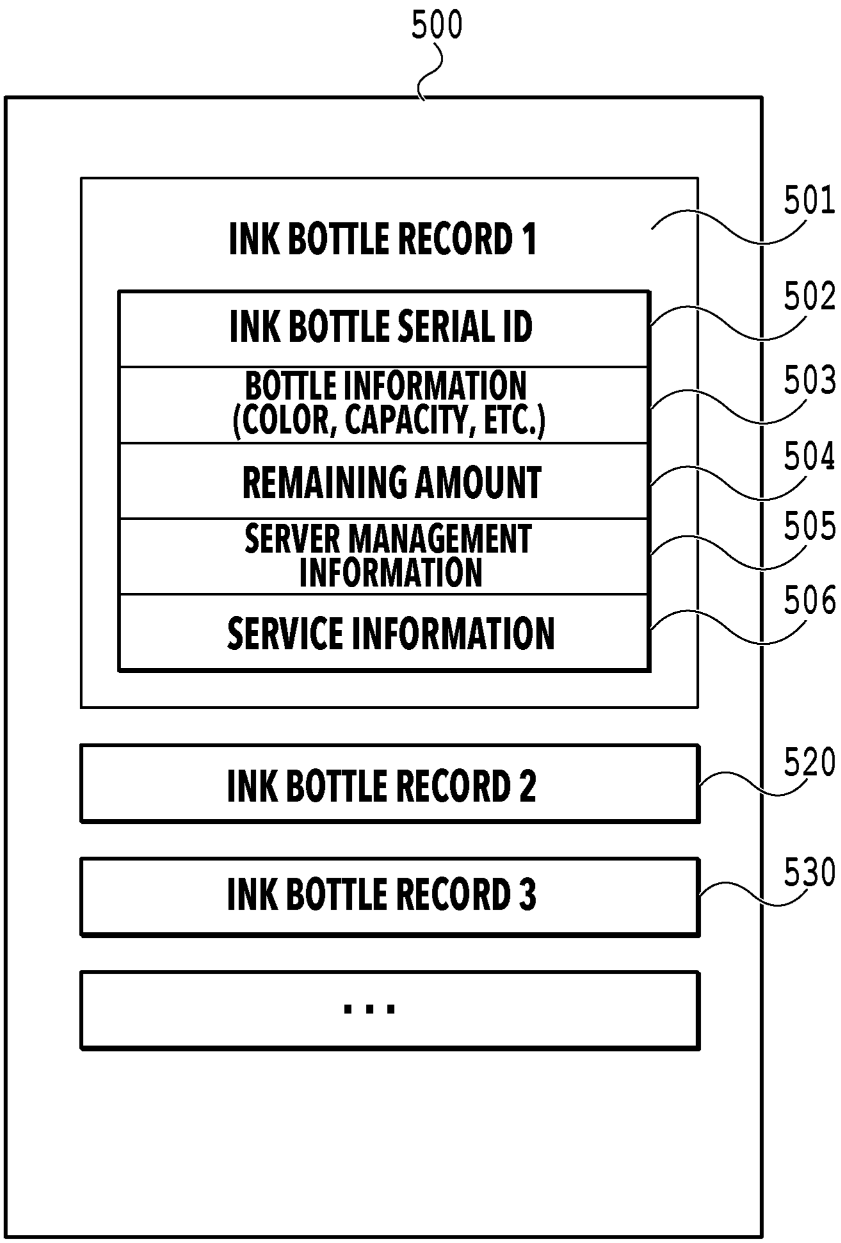
FIG. 5 is a diagram illustrating an example of an ink bottle record.

FIG. 5 is a diagram illustrating an example of the ink bottle record 500 stored in the EEPROM 404 of the liquid ejection apparatus 100. The ink bottle record 500 is a record including various kinds of information about the ink bottle 200 used in the liquid ejection apparatus 100. In the present embodiment, the ink bottle 200 used in the liquid ejection apparatus 100 is identified in the server 400. More specifically, not only the type of ink bottle 200 but also the identifier of the ink bottle 200 are identified in the server 400. Further, the information identified in the server 400 is transmitted to the liquid ejection apparatus 100 and stored as the ink bottle record 500 in the EEPROM 404 of the liquid ejection apparatus 100. Details of this process is described later.

As illustrated in FIG. 5, the ink bottle record 500 is generated in a list format for each ink bottle 200. For example, as the ink bottle records 500, the EEPROM 404 stores the first ink bottle record 501, the second ink bottle record 520, and the third ink bottle record 530 for each color of the ink bottle 200. In each ink bottle record, at least an identifier for uniquely identifying the ink bottle 200 and the remaining amount of liquid in the ink bottle 200 are stored in association with each other. In the example illustrated in the drawings, the bottle information including the type of ink contained in the ink bottle 200 and the capacity of the bottle, the remaining amount of liquid, the server management information, and the service information are also stored in association with each other. Examples of the identifier of the ink bottle 200 include a serial ID numbered at the time of manufacturing. Examples of the ink type include an ink color. In the serial ID field 502, the identifier of the ink bottle 200 is stored. In the bottle information field 503, at least the type of ink contained in the ink bottle 200 and the capacity of the bottle are stored. In the remaining amount field 504, the remaining amount of liquid in the ink bottle 200 identified in the previously-performed storage process for the ink bottle record 500 (S1315 which is described later) is stored. More specifically, the user uses the terminal apparatus 300 to capture an image of the ink bottle 200. The remaining amount of liquid in the ink bottle 200 is obtained by analyzing the captured image of the ink bottle 200 obtained by the image-capturing. Then, the remaining amount of liquid in the ink bottle 200 is registered in the server 400. Subsequently, the remaining amount of liquid in the ink bottle 200 registered in the server 400 is transmitted to the liquid ejection apparatus 100 via the terminal apparatus 300, so that the remaining amount of liquid in the ink bottle 200 is stored in the remaining amount field 504. In the server management information field 505, information for connection to the server 400, security information for connecting to the server 400, a flag representing whether or not the ink bottle record 1100 (described later) is registered in the server 400, etc., is stored. In the service information field 506, information including the state of subscription to the automatic delivery service of the ink bottle 200, the date and time of delivery of the ink bottle 200, etc., is stored.

<<How Ink Is Injected>>

Figure 6A:
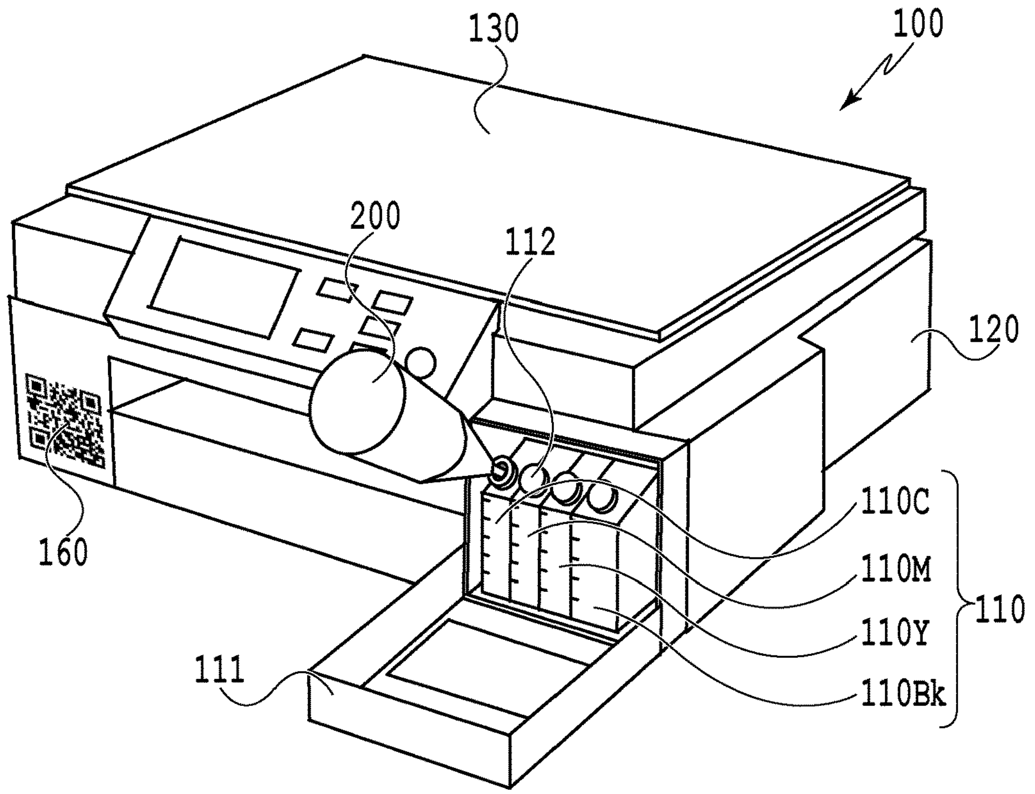
FIG. 6A and FIG. 6B are schematic diagrams illustrating a method of ink injection.
Figure 6B:
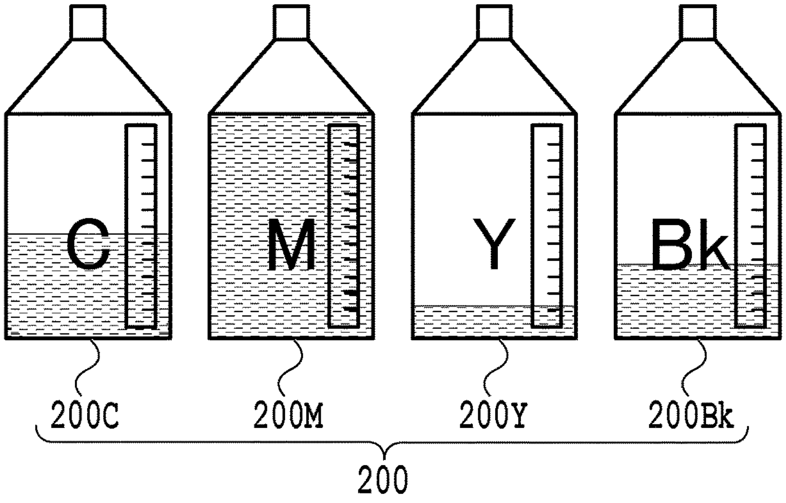

FIG. 6A and FIG. 6B are schematic diagrams illustrating an ink injection method. FIG. 6A is a schematic diagram illustrating how the ink bottle 200 is used to inject ink into the ink tank. As described above, the liquid ejection apparatus 100 according to the present embodiment can eject multiple inks of different types to record a color image on a recording medium. For this reason, the ink tank unit 110 according to the present embodiment is equipped with four types of ink tanks for storing the four color inks of yellow, cyan, magenta, and black, respectively. In the following explanation, in order to simply indicate the four colors, alphabets are assigned such that cyan is C, magenta M, yellow is Y, and black is Bk.

In FIG. 6A, the first ink tank 110C containing cyan ink is illustrated as an ink tank. The second ink tank 110M containing magenta ink is illustrated. The third ink tank 110Y containing yellow ink is illustrated. The fourth ink tank 110Bk containing black ink is illustrated. Note that the basic configuration of each ink tank unit 110 according to the present embodiment is substantially the same. Further, it is also possible that the size of the ink tank unit 110 in which a frequently-used liquid is contained is made larger than the size of the other ink tank units 110. In the example illustrated in the drawings, the size of the fourth ink tank 110Bk is larger than that of the other liquid tanks.

FIG. 6B is a schematic diagram illustrating an example of each of the ink bottles 200 containing ink to be injected into the ink tank unit 110. For example, the first ink bottle 200C corresponds to the first ink tank 110C, and the ink in the first ink bottle 200C can be injected into the first ink tank 110C. Similarly, the second ink bottle 200M corresponds to the second ink tank 110M, and the ink in the second ink bottle 200M can be injected into the second ink tank 110M. Similarly, the third ink bottle 200Y corresponds to the third ink tank 110Y, and the ink in the third ink bottle 200Y can be injected into the third ink tank 110Y. Similarly, the fourth ink bottle 200Bk corresponds to the fourth ink tank 110Bk, and the ink in the fourth ink bottle 200Bk can be injected into the fourth ink tank 110Bk.

As illustrated in FIG. 6A, if the cover 111 of the liquid ejection apparatus 100 is opened, the ink tank unit 110 can be accessed. In a case of injecting ink into the ink tank unit 110, the user opens the cover 111, then opens the cap 112 attached to the liquid injection port, and then injects the type of liquid corresponding to each ink tank from the ink bottle 200. For example, the user can open the cap 112 attached to the liquid injection port of the first ink tank 110C to inject cyan liquid corresponding to the first ink tank 110C from the first ink bottle 200C.

<<Ink Bottle 200>>

Figure 7:
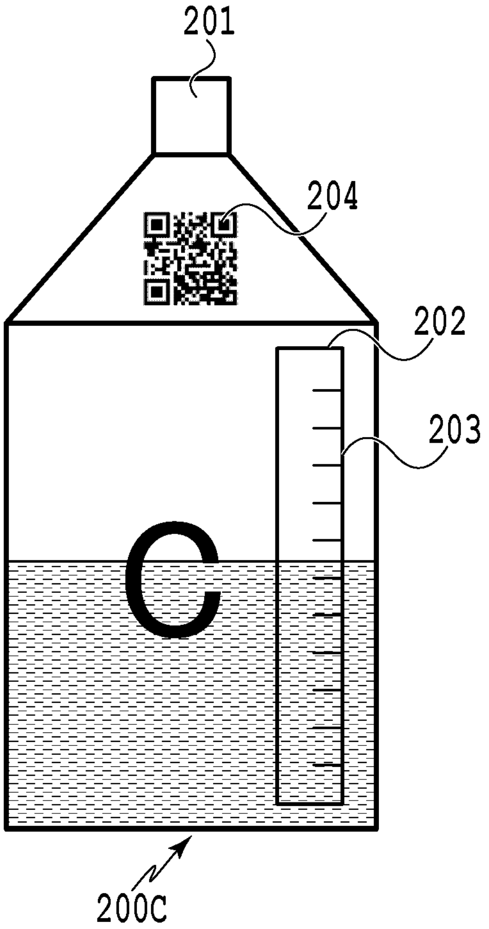
FIG. 7 is a schematic diagram of an ink bottle.

FIG. 7 is a schematic diagram of the ink bottle 200. As illustrated in FIG. 7, the ink bottle 200 includes the nozzle unit 201, which is integrally formed at the upper end part, and a cap, which is detachably attached to the tip of the nozzle unit 201. At the tip of the nozzle unit 201, a discharge port for discharging the ink inside the liquid container unit is formed. The cap is attached to the nozzle unit 201 to seal the discharge port. Accordingly, evaporation, etc., of the ink in the ink bottle 200 can be inhibited. The shape of the nozzle unit 201 differs for each type of ink, thereby inhibiting incorrect injection of different types of ink. For example, the shape of the nozzle unit 201 may be different for each ink color. Furthermore, the shape of the nozzle unit 201 may be different for each ink composition. Accordingly, it is possible to inhibit the color from being changed by mixing different types of ink. That is, by inhibiting injection of different types of ink, it is possible to ensure the image qualities of printed products printed by the liquid ejection apparatus 100. Further, the small window 202 is formed on the liquid container unit of the ink bottle 200 so that the ink in the ink bottle 200 can be seen through from the outside. The scale 203 is formed in the small window 202 for recognizing the remaining amount of liquid.

In the present embodiment, in order to reduce the optical change in ink, a synthetic resin material or the like that does not completely transmit light is used as the material of the ink bottle 200. Note that, in a case where the contained ink that does not easily optically change, the material of the ink bottle 200 may be a transparent synthetic resin material or the like. Accordingly, the user can recognize the remaining amount of liquid through the scale 203 formed in the small window 202. In the present embodiment, since a translucent or transparent synthetic resin material is used as the material of the ink bottle 200, even in a case where an image of the ink bottle 200 is captured using an image-capturing unit, an image of the ink inside the liquid container unit can be captured from the outside.

In the present embodiment, the user captures an image of the ink bottle 200 using the image-capturing unit 811 (described later with reference to FIG. 8) of the terminal apparatus 300. Further, the CPU 802 (described later in FIG. 8) of the terminal apparatus 300 can detect the remaining amount of liquid in the ink bottle 200 by performing image analysis on the captured image obtained by the image-capturing. A publicly-known technique is used for the image analysis. For example, the remaining amount of liquid can be detected by reading the scale 203 on the ink bottle 200 and the position of the water head of the liquid remaining in the ink bottle 200 to recognize the position of the water head on the scale 203.

Further, the ink bottle 200 according to the present embodiment includes the second information holder 204. Examples of the second information holder 204 include a two-dimensional code attached to the surface of the ink bottle 200 or the like. The second information holder 204 holds manufacturing information determined at the point in time where the ink bottle 200 is manufactured. The manufacturing information includes at least an identifier for uniquely identifying the ink bottle 200. Other examples of manufacturing information include the manufacturing date of the ink bottle 200, the capacity of the ink bottle 200 (that is, the amount of ink in a newly-packaged state), the type of ink (for example, color), and the like.

<<Hardware Configuration of the Terminal Apparatus 300>>

Figure 8:
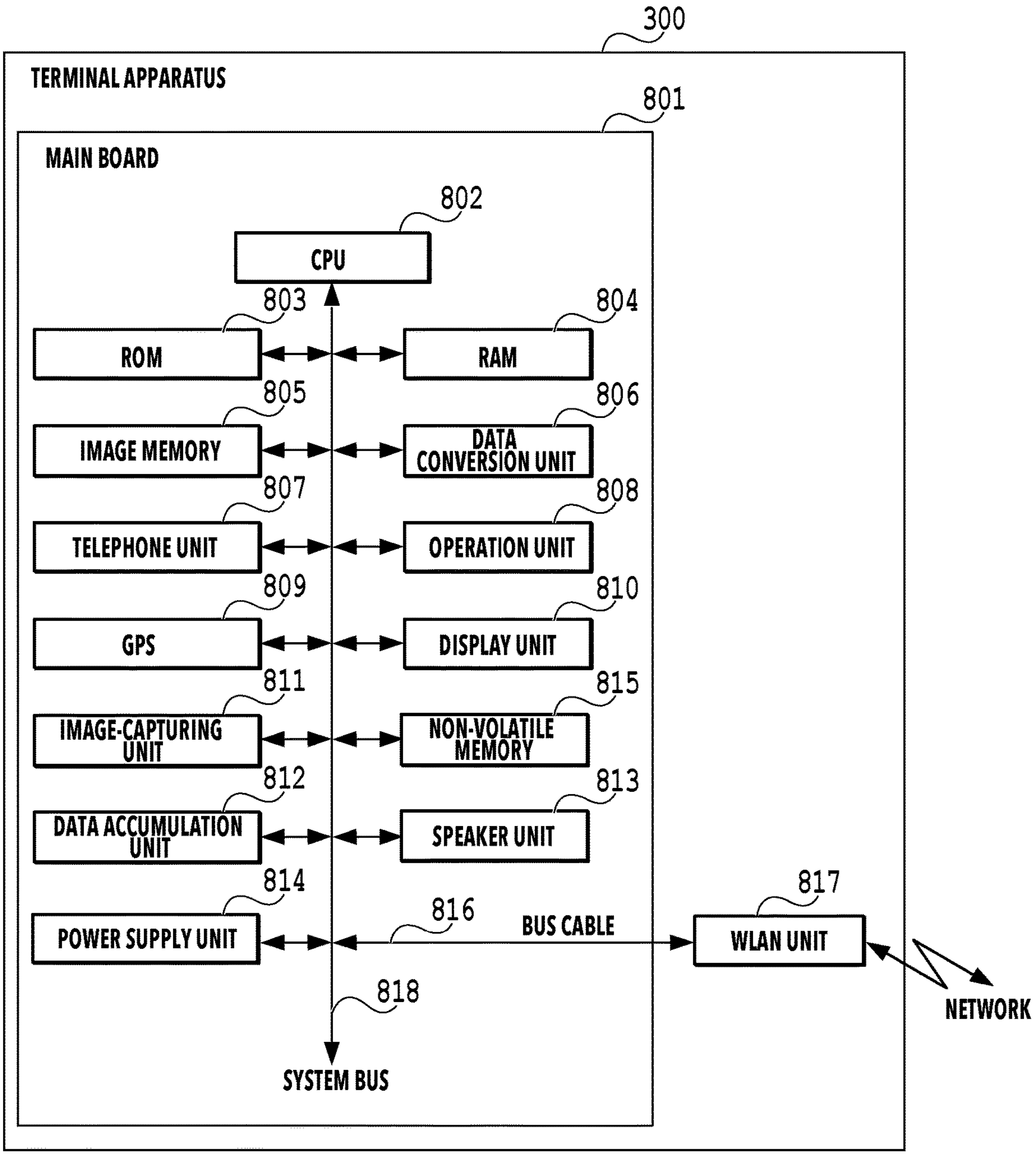
FIG. 8 is a block diagram illustrating the hardware configuration of a terminal apparatus.

Hereinafter, the terminal apparatus 300 according to the present embodiment is explained with reference to FIG. 8 to FIG. 10. FIG. 8 is a block diagram illustrating an example of the hardware configuration of the terminal apparatus 300. The terminal apparatus 300 is equipped with the main board 801, which mainly controls the apparatus, and the WLAN unit 817, which performs WLAN communication. In the main board 801, the CPU 802 is a system control unit and entirely controls the terminal apparatus 300. The ROM 803 stores a control program to be executed by the CPU 802, an embedded operating system (OS) program, etc. In the present embodiment, with each control program stored in the ROM 803, software controls of at least one of scheduling and task switching is performed under the management of the embedded OS stored in the ROM 803. The RAM 804 is configured with an SRAM (static RAM) or the like. The RAM 804 stores program control variables, etc. Further, the RAM 804 stores management data of at least one of setting values and terminal apparatus 300 registered by the user, etc. The RAM 804 is equipped with various kinds of work buffer areas. The image memory 805 is configured with a DRAM (dynamic RAM) or the like. The image memory 805 temporarily stores at least one of the image data received via a communication unit and the image data read from the data accumulation unit 812 to be processed by the CPU 802.

The non-volatile memory 815 is configured with a flash memory or the like, and the non-volatile memory 815 stores data that should be saved even after the power of the terminal apparatus 300 is turned off. The data stored in the non-volatile memory 815 includes various types of information included in the later-described ink bottle record 1000. Note that the above-described memory configuration is not limited as such. For example, the image memory 805 and the RAM 804 may be shared, or data may be backed up in the data accumulation unit 812. Further, although the image memory 805 according to the present embodiment uses a DRAM, it is also possible to use a hard disk or the non-volatile memory 815, etc.

The data conversion unit 806 performs data conversion such as analysis of page description language (PDL) and the like, color conversion, and image conversion. The telephone unit 807 controls a telephone line. The telephone unit 807 realizes telephone communication by processing audio data that is input/output via the speaker unit 813. The operation unit 808 can receive an operation from the user via an operation interface displayed on the display unit 810. Further, it is also possible to remotely operate the liquid ejection apparatus 100 by controlling signals of the operation unit 140 (see FIG. 2) of the liquid ejection apparatus 100. The GPS (Global Positioning System) 809 obtains the current latitude and longitude. The display unit 810 is an LCD, for example, and is capable of performing various kinds of input operations, displaying the operational state and status state of the terminal apparatus 300, etc. The image-capturing unit 811 has a function of electronically recording and encoding an image that is input via the lens unit 902 (see FIG. 9A to FIG. 9D). Images captured by the image-capturing unit 811 are saved in the data accumulation unit 812. The speaker unit 813 has a function of inputting or outputting audio for the telephone function and other functions such as alarm notification. The power supply unit 814 includes a portable battery. Further, the power supply unit 814 controls the battery. The WLAN unit 817 is a unit for performing data communication with the outside. In the present embodiment, the WLAN unit 817 functions as a transmission unit for transmitting the ink bottle record 1000 to at least one of the server 400 serving as an external apparatus and the liquid ejection apparatus 100. Further, the WLAN unit 817 also functions as an obtainment unit for obtaining the ink bottle record 1100 transmitted from an external apparatus. Furthermore, the WLAN unit 817 also functions as an obtainment unit for receiving a request to launch a registration app (described later) from the liquid ejection apparatus 100. Each constituent element of the main board 801 is interconnected via the system bus 818 which is managed by the CPU 802. Further, the WLAN unit 817 is interconnected with each constituent element of the main board 801 via the bus cable 816.

<<Image-Capturing of the Ink Bottle 200>>

Figure 9B:
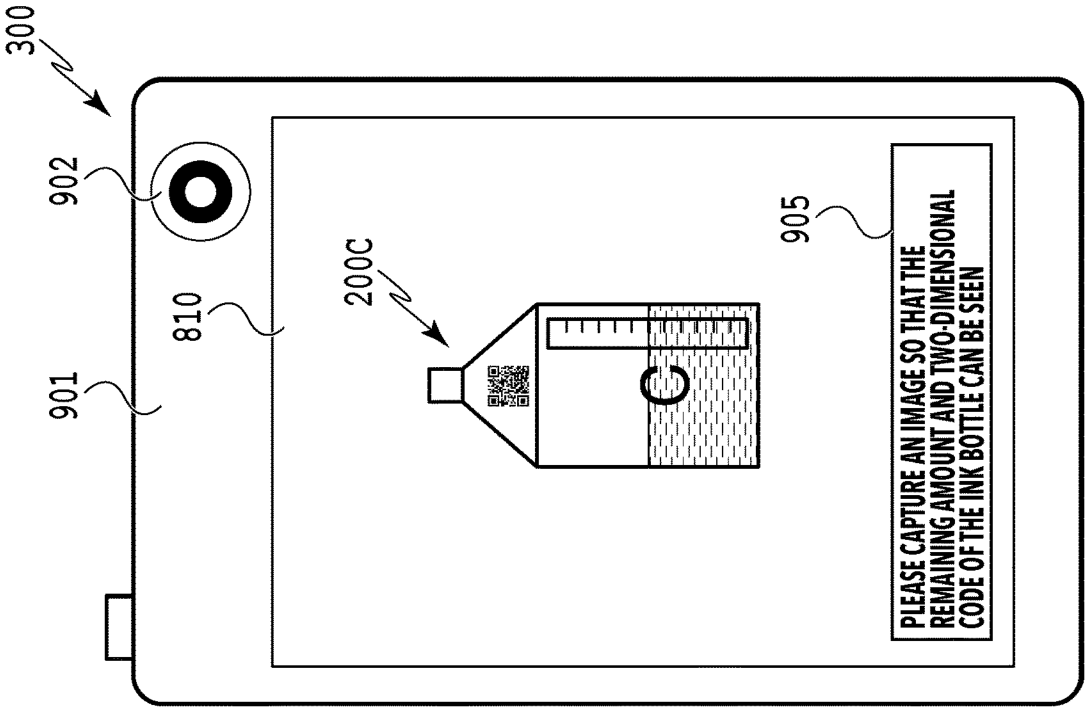
FIG. 9A to FIG. 9D are diagrams schematically illustrating examples of a screen displayed on a display unit of the terminal apparatus.
Figure 9A:
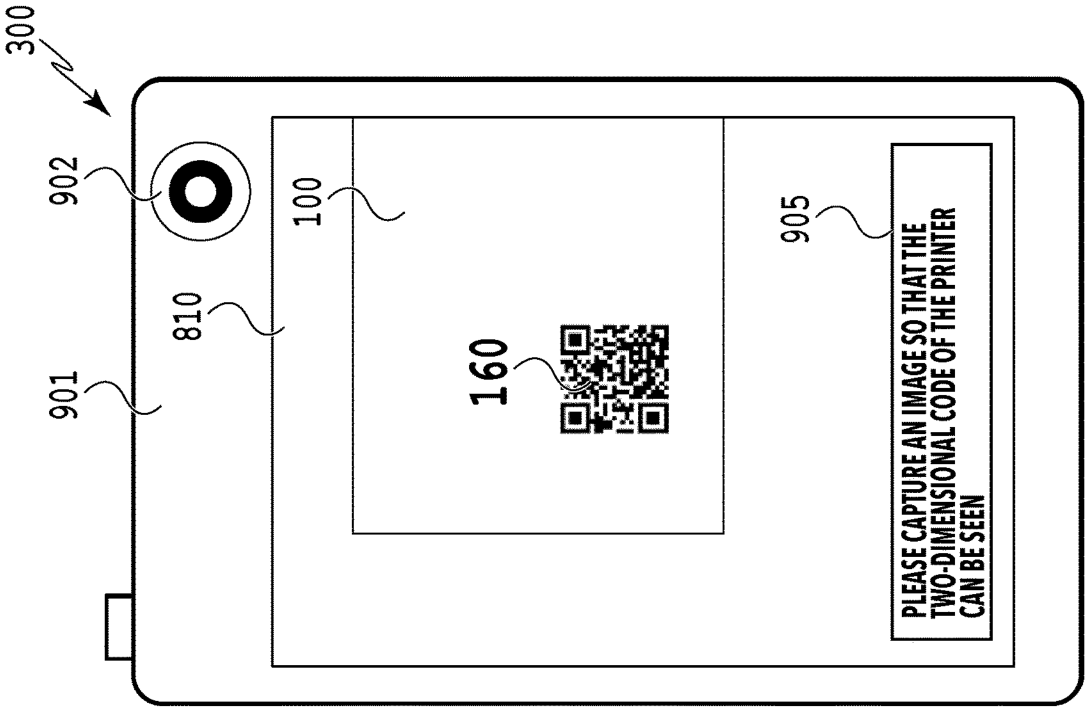

FIG. 9A to FIG. 9D are diagrams schematically illustrating screen examples displayed on the display unit 810 of the terminal apparatus 300. As illustrated in FIG. 9A, the terminal apparatus 300 is equipped with the housing unit 901, the lens unit 902, and the display unit 810 as for its appearance. In FIG. 9A, how the terminal apparatus 300 is used to read the first information holder 160 of the liquid ejection apparatus 100 is illustrated. In the present embodiment, a registration app is launched, and images of the liquid ejection apparatus 100 and the ink bottle 200 are captured using an image-capturing function provided by the registration app. Further, first, an image of the liquid ejection apparatus 100 is captured using the registration app. More specifically, the user uses the registration app to capture an image of the first information holder 160 of the liquid ejection apparatus 100. Accordingly, the liquid ejection apparatus 100 is registered in the server 400 using the registration app. FIG. 9A is an example of a screen in a printer registration mode for launching the registration app to register the liquid ejection apparatus 100 in the server 400.

In the printer registration mode, the user directs the lens unit 902 of the terminal apparatus 300 toward the first information holder 160 of the liquid ejection apparatus 100. Then, as illustrated in FIG. 9A, the image of the first information holder 160 obtained through the above-described image-capturing unit 811 is projected near the center of the display unit 810 of the terminal apparatus 300. The guidance display area 905 is displayed below the display unit 810. The guidance display area 905 displays operation guidance for the user who performs image-capturing. For example, in a case where the image of the first information holder 160 is lacking, the guidance display area 905 displays correction guidance for the user. As another example, in a case where the image-capturing angle of the first information holder 160 is wrong, the guidance display area 905 displays correction guidance for the user. In the example illustrated in the drawing, the message "PLEASE CAPTURE AN IMAGE SO THAT THE TWO-DIMENSIONAL CODE OF THE PRINTER CAN BE SEEN" is displayed in the guidance display area 905. If the first information holder 160 is successfully read, the identifier of the liquid ejection apparatus 100 held by the first information holder 160 can be obtained. The identifier of the liquid ejection apparatus 100 obtained by reading the first information holder 160 is stored in the above-described non-volatile memory 815 and registered as the ink bottle record 1000 (see FIG. 10). Note that registration of the ink bottle record 1000 will be described later.

In FIG. 9B, an example of how the terminal apparatus 300 is used to capture an image of the ink bottle 200 is illustrated. Image-capturing of the ink bottle 200 is also performed using the image-capturing function provided by the registration app. In FIG. 9B, an example where the user captures an image of the first ink bottle 200C in the case of being in the remaining amount registration mode, in which the registration app registers the remaining amount of liquid in the ink bottle 200, for example, is illustrated. As illustrated in FIG. 9B, an image of the first ink bottle 200C obtained through the image-capturing unit 811 is projected near the center of the display unit 810. The guidance display area 905 is displayed below the display unit 810. The guidance display area 905 displays operation guidance for the user who performs image-capturing. If the user captures an image including the second information holder 204 of the first ink bottle 200C and the entire first ink bottle 200C, it becomes possible to perform reading of the second information holder 204 and detection of the remaining amount of liquid. For example, in a case where the image of the ink bottle 200 is lacking, the guidance display area 905 displays correction guidance for the user. As another example, in a case where the image-capturing angle of the ink bottle 200 is wrong, the guidance display area 905 displays correction guidance for the user. In the example illustrated in the drawing, the message "PLEASE CAPTURE AN IMAGE SO THAT THE REMAINING AMOUNT AND TWO-DIMENSIONAL CODE OF THE INK BOTTLE CAN BE SEEN" is displayed in the guidance display area 905. Note that, in the present embodiment, the image-capturing process of the ink bottle 200 is performed after the reading process of the first information holder 160 of the liquid ejection apparatus 100.

Note that the "image-capturing" explained in the above description may be a process of capturing an image file by pressing a button corresponding to a so-called shutter. Alternatively, a process in which the image-capturing is automatically performed at the point in time where the registration app identifies an information holder (two-dimensional code) by image recognition without pressing a button corresponding to the shutter is also possible.

Figure 9C:
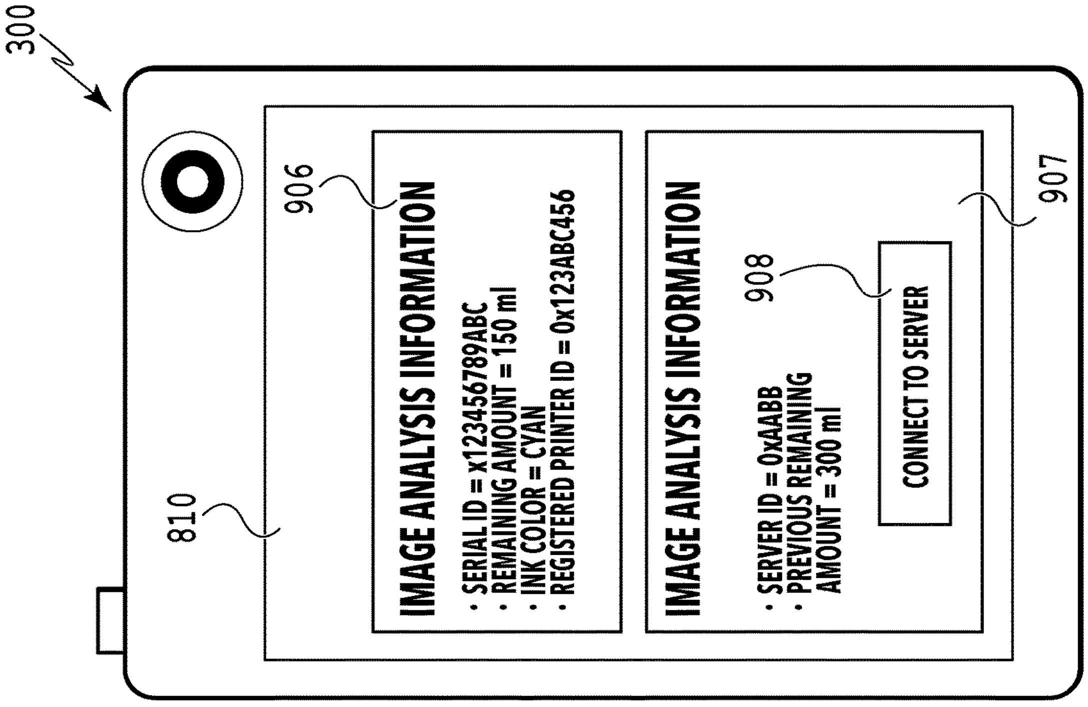

In FIG. 9C, an example of the result of image analysis performed by capturing an image of the first ink bottle 200C in the remaining amount registration mode as illustrated in FIG. 9B is illustrated. As illustrated in the drawing, image analysis information is displayed in the analysis result display area 906. The image analysis information includes information obtained by capturing an image of the ink bottle 200 as well as information held by the registration app. Specifically, in the example of FIG. 9C, the serial ID of the ink bottle, the remaining amount, and the ink color information obtained by capturing an image of the first ink bottle 200C are displayed. Further, as described above, the liquid ejection apparatus 100 used by the user has already been registered in the server by the registration app in the registration mode. Therefore, in FIG. 9C, the registered printer ID is also displayed. The server information display area 907 displays registered server information. If the terminal apparatus 300 receives the contents of the ink bottle record 1100 from the server 400, the image analysis information and registered server information can be displayed thereby (details are described later). Note that, although the example in which the image analysis information and the registered server information are displayed separately is illustrated in FIG. 9C, it is also possible that the image analysis information and the registered server information are not displayed in a distinguished manner.

The details are explained below. The image analysis information includes the identifier of the ink bottle 200 obtained by reading and analyzing the second information holder 204 of the ink bottle 200 and the type of liquid contained in the ink bottle 200. In the example illustrated in the drawing, "x123456789ABC" is displayed as the serial ID of the first ink bottle 200C. "CYAN" is displayed as the color of the liquid contained in the first ink bottle 200C. Furthermore, the image analysis information includes the remaining amount of liquid in the ink bottle 200 obtained by analyzing the captured image of the ink bottle 200. The remaining amount of liquid in the ink bottle 200 can be obtained by analyzing the captured image of the ink bottle 200. In the example illustrated in the drawing, the remaining amount of liquid in the first ink bottle 200C says "150 ml". Note that the display unit 810 may display the amount of liquid that the user has consumed so far together with the remaining amount of liquid in consideration of the capacity of the ink bottle 200 (that is, the amount of liquid at the time in a newly-packaged state). Furthermore, the image analysis information includes the identifier of the liquid ejection apparatus 100 that uses the ink bottle 200 whose remaining amount of liquid is a management target. The registration app has a function of searching for the liquid ejection apparatus 100 at the time of launching, and the identifier of the liquid ejection apparatus 100 found by this function may be displayed. Alternatively, the identifier of the liquid ejection apparatus 100 may be displayed based on information obtained from a server. For example, as described above, the registration app of the present embodiment first registers the liquid ejection apparatus 100 in a server. Thereafter, in the remaining amount registration mode, the identifier of the liquid ejection apparatus 100 is transmitted to the server 400 together with the identifier of the ink bottle 200 (described later). Further, the identifier of the liquid ejection apparatus 100 and the identifier of the ink bottle 200 are associated in the server 400 and registered as the ink bottle record 1100 (described later). Further, the contents of the ink bottle record 1100 are sent from the server 400 to the terminal apparatus 300 and registered as the ink bottle record 1000 in the non-volatile memory 815. In the example illustrated in the drawings, it is also possible that the registration app displays "0x123ABC456" as the registered printer ID with reference to the ink bottle record 1000. Further, the registered printer ID may not be displayed.

The server information display area 907 displays the server ID of the server 400 obtained by image-capturing and analyzing of the first information holder 160 of the liquid ejection apparatus 100. In the example illustrated in the drawing, "0xAABB" is displayed as the server ID. Furthermore, it is also possible that the server information display area 907 displays the remaining amount of liquid obtained as a result of the previous image analysis (previous remaining amount). The example illustrated in the drawings is an example in which the remaining amount of liquid obtained as a result of the previous image analysis is "300 ml". Further, in the example illustrated in the drawings, the "CONNECT TO SERVER" button 908 is displayed in the server information display area 907. If the user presses the "CONNECT TO SERVER" button 908, connection is made to the server 400, and the contents of the latest ink bottle record 1100 are sent from the server 400 to the terminal apparatus 300. The CPU 802 of the terminal apparatus 300 stores the contents of the sent ink bottle record 1100 as the ink bottle record 1000 in the non-volatile memory 815. That is, if the user presses the "CONNECT TO SERVER" button 908, the ink bottle record 1000 is updated and the latest contents of the ink bottle record 1000 are displayed on the display unit 810.

Figure 9D:
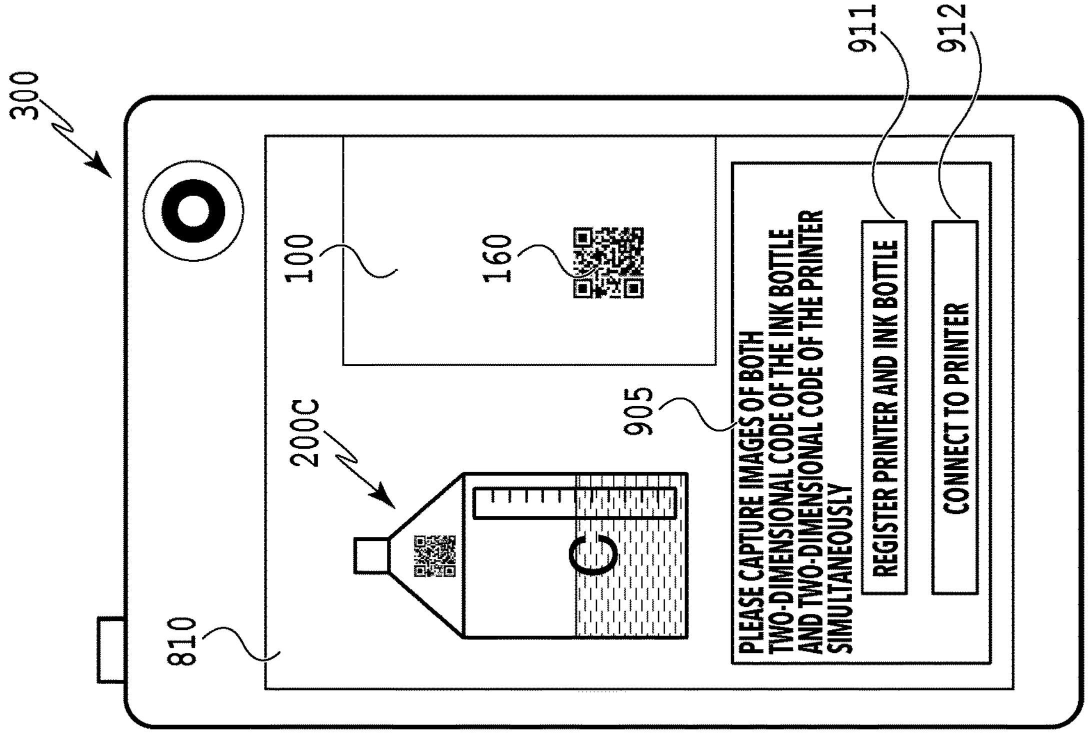

FIG. 9D is a diagram schematically illustrating how the user uses the terminal apparatus 300 to simultaneously capture images of the second information holder 204 of the ink bottle 200 and the first information holder 160 of the liquid ejection apparatus 100. In the above-described example, although the image of the liquid ejection apparatus 100 is captured first and then the image of the ink bottle 200 is captured, it is also possible that the images of the liquid ejection apparatus 100 and the ink bottle 200 are captured simultaneously. In the example illustrated in FIG. 9D, in the upper area of the display unit 810 of the terminal apparatus 300, the second information holder 204 of the ink bottle 200 and the first information holder 160 of the liquid ejection apparatus 100, which are obtained through the image-capturing unit 811, are displayed. On the other hand, the guidance display area 905 is displayed in the lower area of the display unit 810. In the example illustrated in the drawing, the guidance display area 905 illustrated in FIG. 9D displays guidance prompting the user to simultaneously capture images of the second information holder 204 and the first information holder 160. Furthermore, in the guidance display area 905, the "REGISTER PRINTER AND INK BOTTLE" button 911 and the "CONNECT TO PRINTER" button 912 are displayed. If the user presses the "REGISTER PRINTER AND INK BOTTLE" button 911 in the state illustrated in the drawing, the image of the first ink bottle 200C equipped with the second information holder 204 and the liquid ejection apparatus 100 equipped with the first information holder 160 is captured. Accordingly, the second information holder 204 and the first information holder 160 included in the captured image can be read at the same time. That is, the identifier of the ink bottle 200 and the identifier of the liquid ejection apparatus 100 included in the same captured image can be simultaneously registered in the server 400. Further, if the user presses the "CONNECT TO PRINTER" button 912, the contents of the ink bottle record 1000 currently stored in the non-volatile memory 815 are transmitted to the liquid ejection apparatus 100, so that the contents of the ink bottle record 500 can be updated.

Note that, in the above-described example, although the example in which various kinds of operations are performed by the functions of the registration app has been explained, there is not a limitation as such. For example, each information holder may include the URL of a web-based application (web application) so that the above-described functions are executed using the web application.

<<Ink Bottle Record 1000>>

Figure 10:
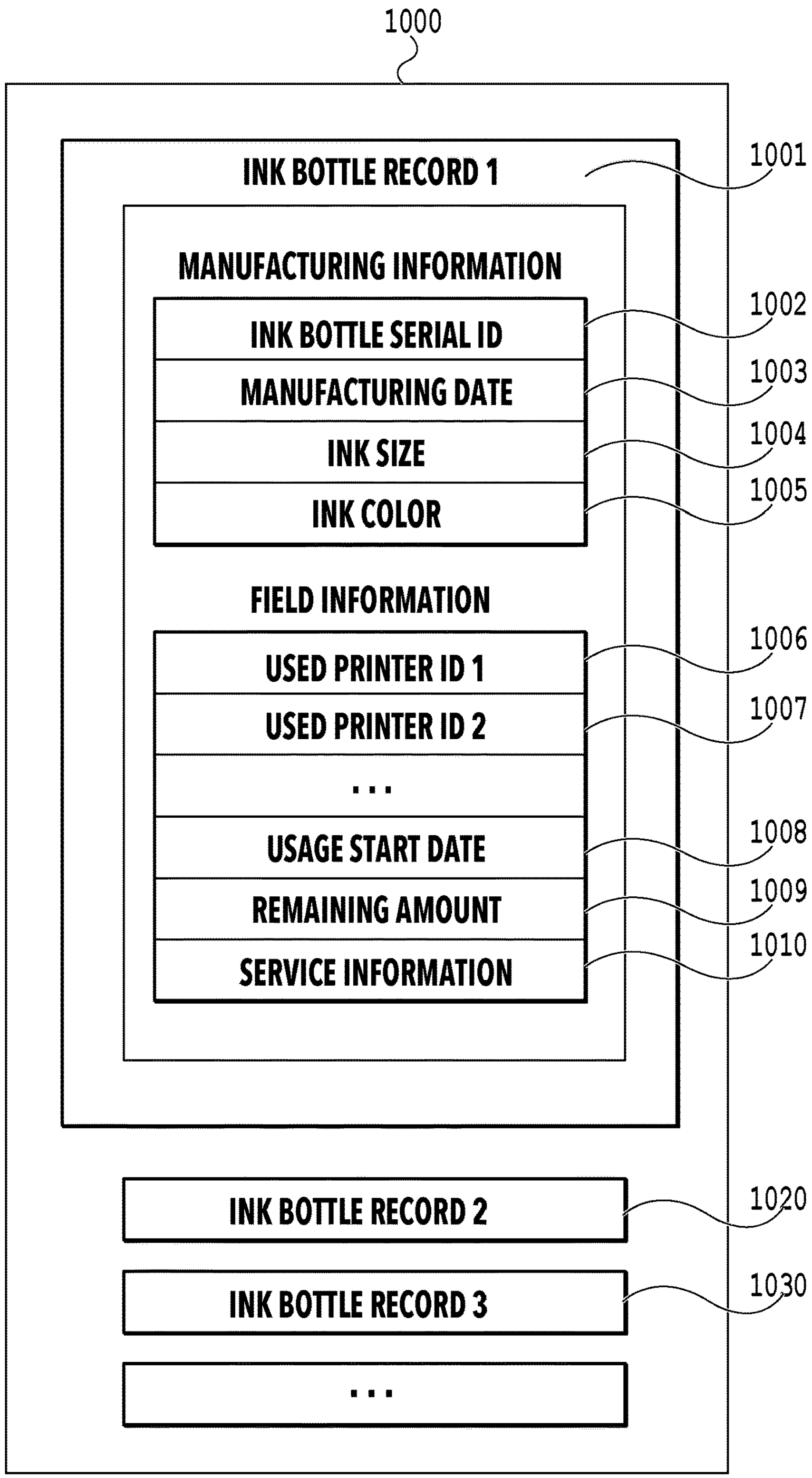
FIG. 10 is a diagram illustrating an example of an ink bottle record.

FIG. 10 is an example of the ink bottle record 1000 stored in the non-volatile memory 815 of the terminal apparatus 300. The ink bottle record 1000 stores the logs of the ink bottles 200 that have been handled by the terminal apparatus 300. The logs of the ink bottles 200 are generated in a list format for the respective ink bottles 200. For example, the non-volatile memory 815 stores the first ink bottle record 1001, the second ink bottle record 1020, and the third ink bottle record 1030. Each ink bottle record holds "MANUFACTURING INFORMATION" and "FIELD INFORMATION" in association with each other.

The "MANUFACTURING INFORMATION" is information for uniquely identifying the ink bottle 200 and is information determined at the point in time where the ink bottle 200 is manufactured. The "MANUFACTURING INFORMATION" includes at least the identifier of the ink bottle 200. In the example illustrated in the drawing, the manufacturing date of the ink bottle 200, the ink size (for example, the capacity of the ink bottle 200), and the color of the ink are held as the "MANUFACTURING INFORMATION". The serial ID field 1002 stores the identifier of the ink bottle 200 whose remaining amount of liquid is a management target (hereinafter simply referred to as a "management target"). For example, in a case where the first ink bottle 200C illustrated in FIG. 9A is a management target, the serial ID "x123456789ABC" is stored. The manufacturing date field 1003 stores at least the manufacturing date of the ink bottle 200. The ink size field 1004 stores at least the capacity of the ink bottle 200. For example, the capacity is expressed as 300 ml, 200 ml, or 100 ml. Alternatively, it is also possible that the capacity is represented as the relative size of the ink bottle 200, such as large, medium, or small. The ink color field 1005 stores the color of liquid contained in the ink bottle 200. The color of liquid is represented as a specific color such as cyan, magenta, yellow, or black. For example, in a case where the first ink bottle 200C illustrated in FIG. 9A is a management target, the ink color "cyan" is stored.

"FIELD INFORMATION" is information that changes according to how the ink bottle 200 is used. "FIELD INFORMATION" includes at least the remaining amount of liquid in the ink bottle 200. In the example illustrated in the drawing, in addition to the remaining amount of liquid in the ink bottle 200, the used printer ID, the usage start date, and service information are held as "FIELD INFORMATION". The first used printer ID field 1006 stores the serial ID of the liquid ejection apparatus 100 into which the liquid in the ink bottle 200 is injected. For example, in a case where the liquid ejection apparatus 100 illustrated in FIG. 9C is a management target, the printer ID "0x123ABC456" is stored. Examples of a method of inputting the serial ID of the liquid ejection apparatus 100 include an example of reading the first information holder 160 of the liquid ejection apparatus 100 using the image-capturing unit 811 of the terminal apparatus 300. For example, as illustrated in FIG. 9C, the reading can be performed by use of the image-capturing unit 811. As another example, the user manually performs an input operation by pressing a soft keyboard displayed on the display unit 810 of the terminal apparatus 300. Further, in a case where the user uses multiple liquid ejection apparatuses 100, the liquid contained in one ink bottle 200 may be divided and injected into the multiple liquid ejection apparatuses 100. Therefore, it is also possible that multiple used printer ID fields are provided according to the number of liquid ejection apparatuses 100 used by the user. In the example illustrated in the drawing, the second used printer ID field 1007 is provided. In the second used printer ID field 1007, a serial ID different from the serial ID that is input in the first used printer ID field 1006 is stored. The usage start date field 1008 stores the date on which the user used the ink bottle 200 whose remaining amount of liquid is a management target for the first time. For example, the date on which the user captured an image of the newly-packaged ink bottle 200 and registered the ink bottle record 1000 of the ink bottle 200 in the server 400 for the first time is stored. The remaining amount field 1009 stores the remaining amount of liquid remaining in the ink bottle 200. In the example illustrated in FIG. 9B, "150 ml" is stored. The remaining amount of liquid is updated each time the liquid in the ink bottle 200 is consumed. Note that the flow for updating the remaining amount of liquid is described later. The service information field 1010 stores information including the subscription state of the ink bottle automatic delivery service, the previous delivery date, and the like. That is, information related to the automatic delivery service for the ink bottle 200 is stored. Furthermore, the service information field 1010 may store unique information. For example, a date and time of communication with the server 400 and information related to a point service which is provided according to the consumed amount of liquid may be stored.

<<Ink Bottle Record 1100>>

Figure 11:
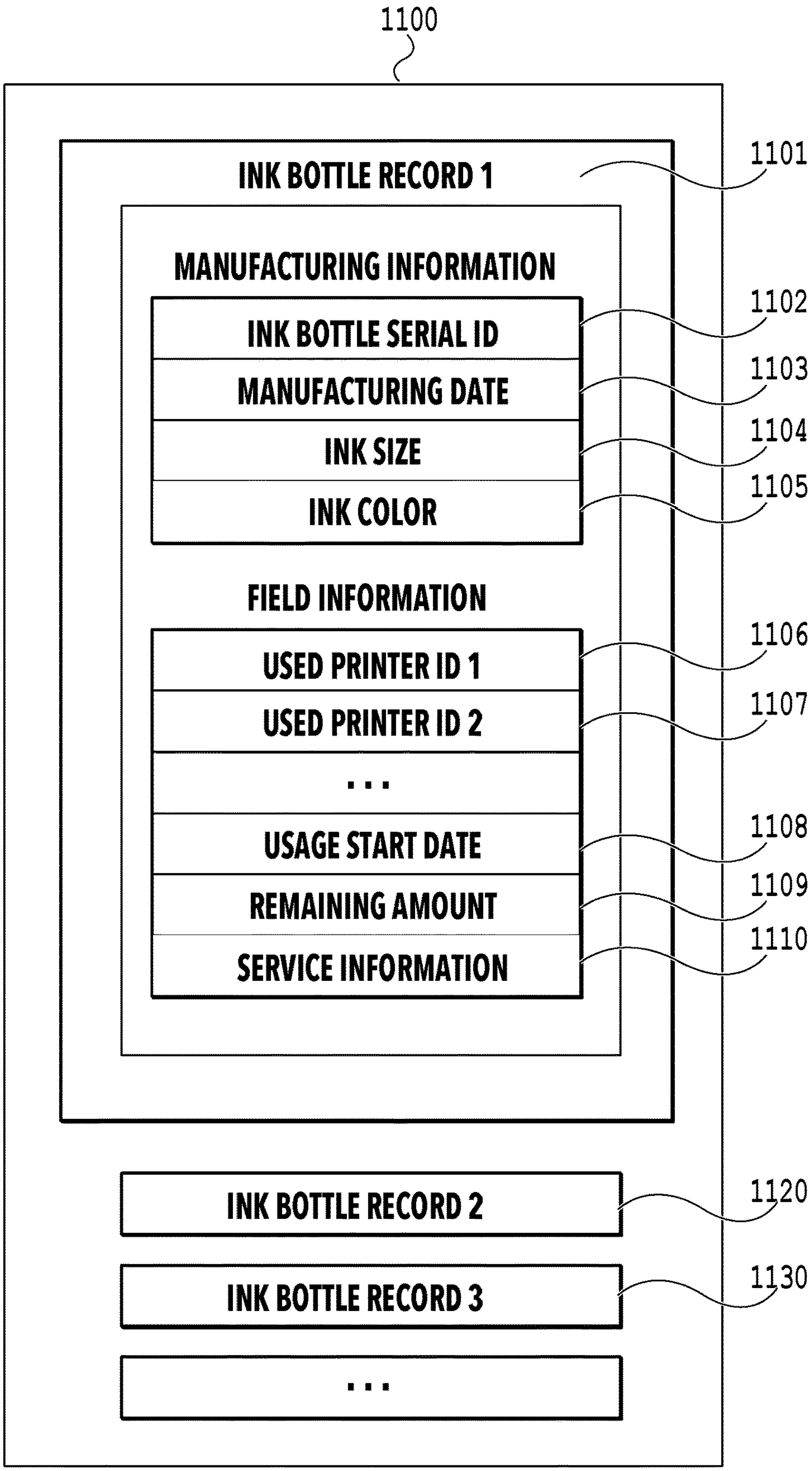
FIG. 11 is a diagram illustrating an example of an ink bottle record.

FIG. 11 is an example of the ink bottle record 1100 registered in the server 400. In the ink bottle record 1100, the logs of the ink bottles 200 that have been management targets are registered. The ink bottle record 1100 is registered in a list format for each ink bottle 200. The contents of the ink bottle record 1100 registered in a list format are the same as those of the ink bottle record 1000. Therefore, the contents that overlap with those of the ink bottle record 1000 are omitted as appropriate.

In the example illustrated in the drawing, the server 400 stores the first ink bottle record 1101, the second ink bottle record 1120, and the third ink bottle record 1130. The serial ID field 1102 stores at least the identifier (for example, the serial ID) of the ink bottle 200 that is a management target. The manufacturing date field 1103 stores at least the manufacturing date of the ink bottle 200. The ink size field 1104 stores at least the capacity of the ink bottle 200. The ink color field 1105 stores the color of liquid contained in the ink bottle 200. The first used printer ID field 1106 stores the identifier (for example, the serial ID) of the liquid ejection apparatus 100 into which the liquid in the ink bottle 200 is injected. In a case where the user uses multiple liquid ejection apparatuses 100, an identifier different from the serial ID that is input to the first printer ID field 1106 is input to the second used printer ID field 1107. The usage start date field 1108 stores the date on which the user used the ink bottle 200 whose remaining amount of liquid is a management target for the first time. The remaining amount field 1109 stores remaining amount of liquid in the ink bottle 200. The service information field 1110 stores information related to the automatic delivery service for the ink bottle 200.

<<Overall Processing Flow of the Information Processing System>>

<<Registration of the Liquid Ejection Apparatus 100>>

Figure 12:
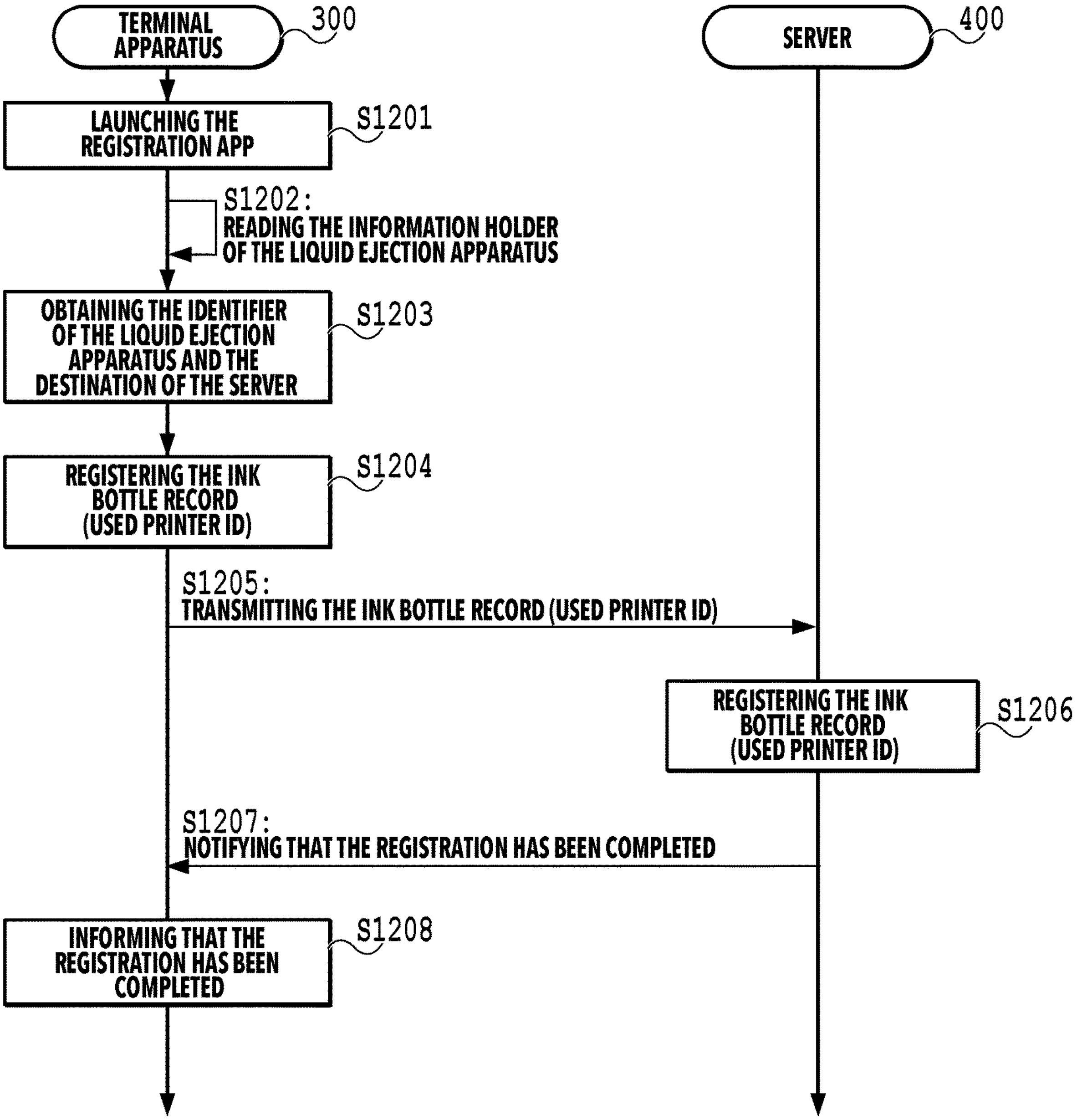
FIG. 12 is a sequence diagram illustrating a flow of processing in the entire information processing system.

FIG. 12 is a sequence diagram illustrating a processing flow between apparatuses, in which the terminal apparatus 300 reads the first information holder 160 of the liquid ejection apparatus 100 and analyzes the read information to register information related to the liquid ejection apparatus 100 in the server 400. By installing the above-described registration app in the terminal apparatus 300, the icon of the registration app is displayed on the display unit 810. Further, if the icon is pressed, a series of processes illustrated in the sequence diagram of FIG. 12 is started. Hereinafter, exchanges between apparatuses are explained in chronological order along the sequence diagram of FIG. 12. Note that the symbols "S" in the sequence diagrams and each flowchart to be described later represent steps.

If the user presses the above-described icon, the CPU 802 of the terminal apparatus 300 launches the registration app in S1201. If the registration app is launched, the image-capturing unit 811 of the terminal apparatus 300 is launched, so that the first information holder 160 of the liquid ejection apparatus 100 can be read. If the user holds the terminal apparatus 300 so that the first information holder 160 can be seen, the CPU 802 reads the first information holder 160 in S1202. In S1203, the CPU 802 obtains at least the identifier of the liquid ejection apparatus 100 and the destination of the server 400 that manages the liquid ejection apparatus 100, based on the information held by the first information holder 160. In S1204, the CPU 802 stores the identifier of the liquid ejection apparatus 100 in the non-volatile memory 815. In S1205, the CPU 802 transmits the identifier of the liquid ejection apparatus 100 to the server 400.

If the transmission is successful, the server 400 registers the identifier of the liquid ejection apparatus 100 as the ink bottle record 1100 in S1206. Note that, in the present embodiment, although the identifier of the liquid ejection apparatus 100 is registered in the first used printer ID field 1106 in the present step, the other fields are blank at this point in time. If the registration of the identifier of the liquid ejection apparatus 100 is completed, the server 400 transmits a notification that the registration of the identifier of the liquid ejection apparatus 100 has been completed to the terminal apparatus 300 in S1207.

If the transmission is successful, the terminal apparatus 300 informs the user in S1208 that the registration of the identifier of the liquid ejection apparatus 100 has been completed. The present flow ends if the informing is completed. By executing the present flow, the identifier of the unregistered liquid ejection apparatus 100 can be registered in the server 400 as a management target.

<<Registration of the Ink Bottle 200>>

Figure 13:
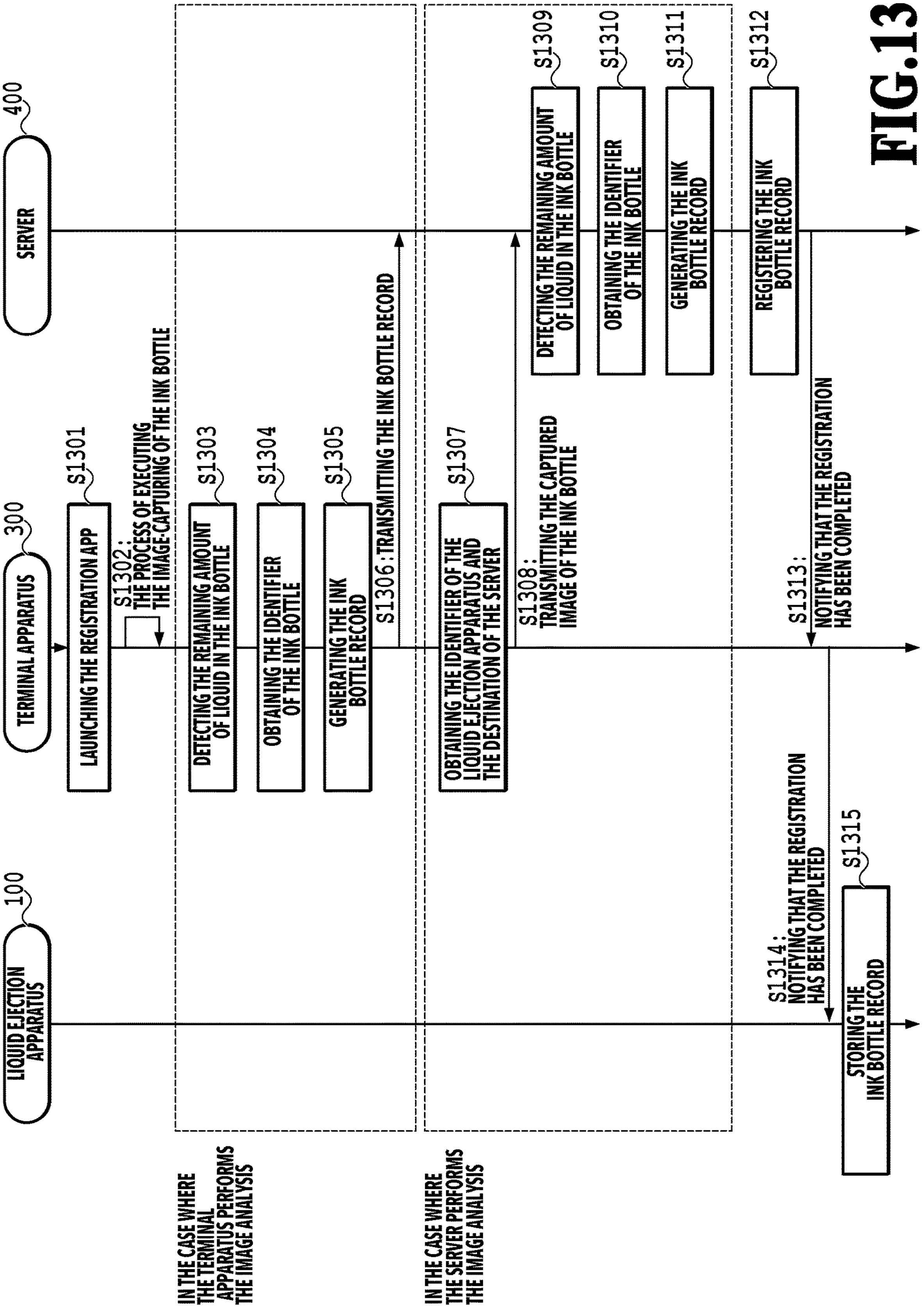
FIG. 13 is a sequence diagram illustrating a flow of processing in the entire information processing system.

FIG. 13 is a sequence diagram illustrating a processing flow between apparatuses, in which a captured image obtained by capturing an image of the ink bottle 200 with the terminal apparatus 300 is analyzed to register manufacturing information of the ink bottle 200 and the remaining amount of liquid in the server 400. By installing the above-described registration app in the terminal apparatus 300, the icon of the registration app is displayed on the display unit 810. Further, if the icon is pressed, a series of processes illustrated in the sequence diagram of FIG. 13 is started.

If the user presses the above-described icon, the CPU 802 of the terminal apparatus 300 launches the registration app in S1301. If the registration app is launched, the CPU 802 searches for available liquid ejection apparatuses 100 within the network to obtain the identifiers of the found liquid ejection apparatuses 100. The obtained identifiers of the liquid ejection apparatuses 100 are held in a storage unit of the terminal apparatus 300. Subsequently, if the user presses a “REGISTER INK BOTTLE” button (not illustrated in the drawings) displayed on the display unit 810 after the registration app is launched, the CPU 802 executes the process of capturing an image of the ink bottle 200 in S1302. After the image of the ink bottle 200 is captured, the flow is divided depending on whether the CPU 802 of the terminal apparatus 300 analyzes the captured image or the server 400 analyzes the captured image. If the CPU 802 performs the image analysis, the processing proceeds to S1303. On the other hand, if the server 400 performs the image analysis, the processing proceeds to S1307.

First, the case where the terminal apparatus 300 performs the image analysis is explained. In S1303, the CPU 802 obtains the captured image of the ink bottle 200, analyzes the captured image of the ink bottle 200 in a publicly-known analysis method, and detects the remaining amount of liquid in the ink bottle 200. The detected remaining amount of liquid is held in a storage unit of the terminal apparatus 300. In S1304, the CPU 802 obtains at least the identifier of the ink bottle 200 whose image has been captured, based on the information held by the second information holder 204. That is, here, the CPU 802 functions as an identifier obtainment unit. Further, the CPU 802 holds the obtained identifier of the ink bottle 200 in a storage unit of the terminal apparatus 300. Note that the order of the processes S1303 and S1304 may be switched or may be performed simultaneously. In S1305, the CPU 802 associates the identifier of the ink bottle 200 with the remaining amount of liquid in the ink bottle 200 to generate the ink bottle record 1000 (see FIG. 10). Specifically, the CPU 802 refers to the identifier of the pre-registered liquid ejection apparatus 100. Further, the identifier of the ink bottle 200 and the remaining amount of liquid in the ink bottle 200 are associated and registered in the ink bottle record 1000 that matches the identifier of the liquid ejection apparatus 100 obtained by the searching. Needless to say, in a case where manufacturing information other than the identifier of the ink bottle 200 is obtained by reading the second information holder 204, the manufacturing information other than the identifier of the ink bottle 200 will be registered in the corresponding fields. After the ink bottle record 1000 is registered in the non-volatile memory 815, the CPU 802 refers to the pre-registered destination of the server 400 and transmits the ink bottle record 1000 to the server 400 in S1306. Then, thereafter, the processing proceeds to S1312.

Next, the case where the server 400 performs the image analysis is explained. In S1307, the CPU 802 of the terminal apparatus 300 obtains a captured image including at least the entire second information holder 204 and ink bottle 200. That is, here, the CPU 802 functions as an image obtainment unit. In S1308, the CPU 802 refers to the pre-registered destination of the server 400 to transmit the obtained captured image of the ink bottle 200 and the identifier of the liquid ejection apparatus 100 obtained by the searching at the time of launching of the registration app to the server 400. That is, the captured image of the ink bottle 200 and the identifier of the liquid ejection apparatus 100 that is near the terminal apparatus 300 at the time of image-capturing of the ink bottle 200 are transmitted from the terminal apparatus 300 to the server 400. If the transmission is successful, the server 400 detects the remaining amount of liquid in the ink bottle 200 in S1309. In S1310, the server 400 obtains the identifier of the ink bottle 200 by analyzing the second information holder 204 included in the captured image of the ink bottle 200. Note that the order of the processes S1309 and S1310 may be switched or may be performed simultaneously. In S1311, the server 400 associates the identifier of the ink bottle 200 with the remaining amount of liquid in the ink bottle 200 to generate the ink bottle record 1100 (see FIG. 11). Specifically, the server 400 refers to the pre-registered ink bottle record 1100. Further, the transmitted identifier of the ink bottle 200 and the remaining amount of liquid in the ink bottle 200 are associated and registered in the ink bottle record 1100 which matches the identifier of the liquid ejection apparatus 100 obtained by the searching and in which the identifier of the liquid ejection apparatus 100 is registered.

In S1312, the server 400 registers the obtained ink bottle record 1100. In the case of going through S1306, the server 400 registers the contents of the ink bottle record 1000 transmitted from the terminal apparatus 300 as the ink bottle record 1100. In the case of going through S1311, the server 400 registers the contents generated in S1311 as the ink bottle record 1100. In S1313, the server 400 transmits the contents of the ink bottle record 1100 to the terminal apparatus 300 and provides a notification that the registration of the ink bottle record 1100 has been completed. The terminal apparatus 300 obtains the contents of the ink bottle record 1100 registered in the server 400 and stores the contents in its own storage unit, so as to be thereby capable of displaying image analysis information and registered server information (see FIG. 9C) on the display unit 810.

In S1314, the terminal apparatus 300 transmits the contents of the obtained ink bottle record 1100 to the liquid ejection apparatus 100 and provides a notification that the registration of the ink bottle record 1100 in the server 400 has been completed.

In S1315, the liquid ejection apparatus 100 stores (registers) the contents of the ink bottle record 1100 in the EEPROM 404 as the ink bottle record 500 (see FIG. 5). Accordingly, the liquid ejection apparatus 100 can display the contents of the ink bottle record 500 on the display unit 150 of the liquid ejection apparatus 100. If the ink bottle record 500 is stored in the EEPROM 404, the present flow ends. If the present flow is executed, by using the identifier of the pre-registered liquid ejection apparatus 100 as a clue, the identifier of the unregistered ink bottle 200 and the remaining amount of liquid are associated with each other and registered in the server 400, so as to be a management target.

<<Updating the Remaining Amount of Liquid>>

Figure 14:
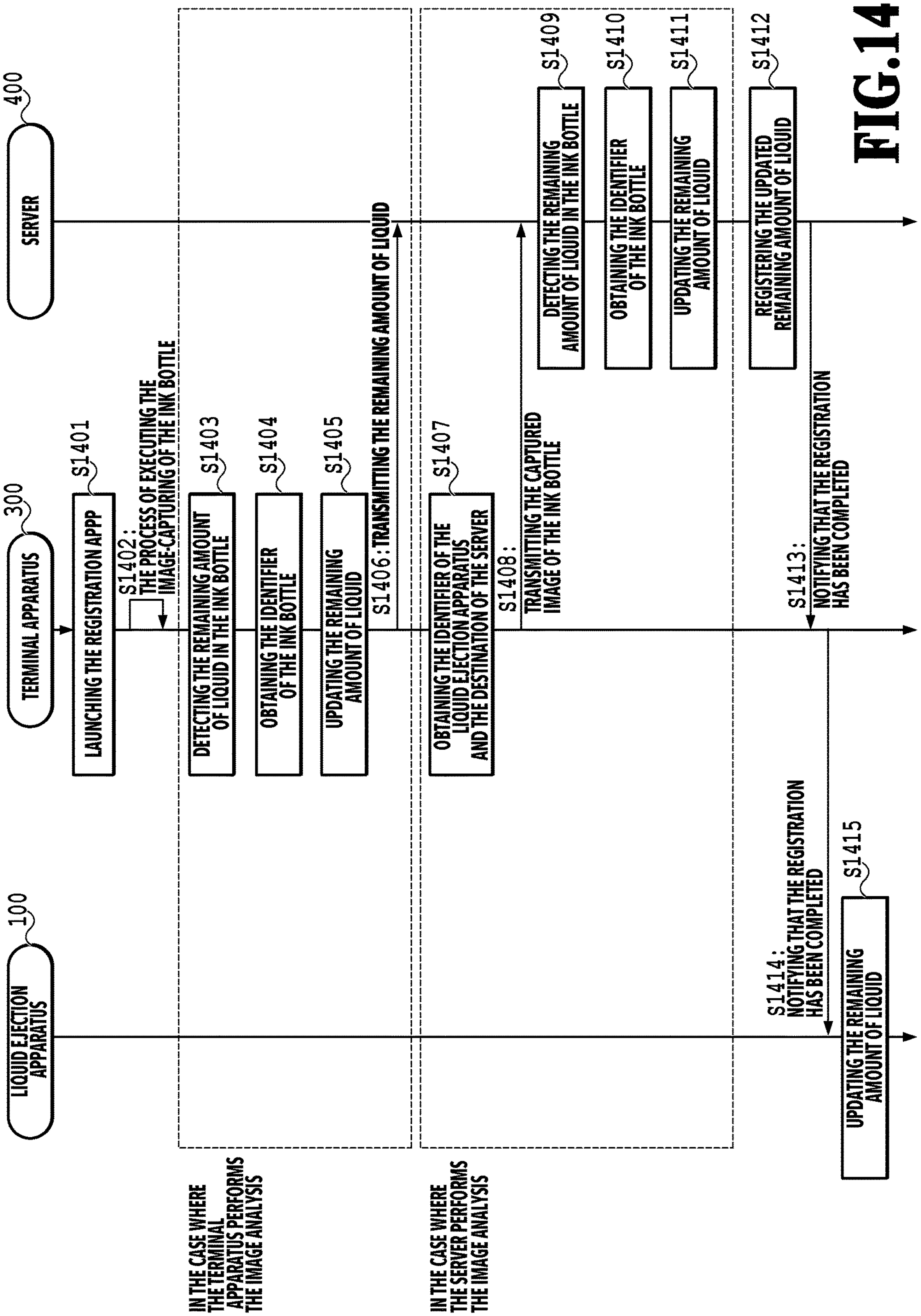
FIG. 14 is a sequence diagram illustrating a flow of processing in the entire information processing system.

FIG. 14 is a sequence diagram illustrating a processing flow between apparatuses, in which a captured image obtained by capturing an image of the ink bottle 200 with the terminal apparatus 300 is analyzed to update the remaining amount of liquid in the ink bottle 200 to be registered in the server 400. By installing the above-described registration app in the terminal apparatus 300, the icon of the registration app is displayed on the display unit 810. Further, if the icon is pressed, the series of processes illustrated in the sequence diagram of FIG. 14 is started. In the following explanation, the explanation of the processes common to the registration processing of the ink bottle 200 is omitted as appropriate, and the explanation focuses on the different points.

If the user presses the above-described icon, the CPU 802 of the terminal apparatus 300 launches the registration app in S1401. If the registration app is launched, the CPU 802 searches for available liquid ejection apparatuses 100 within the network to obtain the identifiers of the found liquid ejection apparatuses 100. The obtained identifiers of the liquid ejection apparatuses 100 are held in a storage unit of the terminal apparatus 300. Subsequently, if the user presses a "REGISTER INK BOTTLE" button (not illustrated in the drawings) displayed on the display unit 810 after the registration app is launched, the CPU 802 executes the process of capturing an image of the ink bottle 200 in S1402. For example, as illustrated in FIG. 9B, if the user holds the terminal apparatus 300 and start capturing an image so that the entire first ink bottle 200C including the second information holder 204 can be captured, the process of capturing an image of the first ink bottle 200C is executed. After the image of the ink bottle 200 is captured, the flow is divided depending on whether the CPU 802 of the terminal apparatus 300 analyzes the captured image or the server 400 analyzes the captured image. If the CPU 802 performs the image analysis, the processing proceeds to S1403. On the other hand, if the server 400 performs the image analysis, the processing proceeds to S1407.

First, the case where the terminal apparatus 300 performs the image analysis is explained. In S1403, the CPU 802 obtains the captured image of the ink bottle 200, analyzes the captured image of the ink bottle 200 in a publicly-known analysis method, and detects the remaining amount of liquid in the ink bottle 200. Thereafter, the obtained remaining amount of liquid is stored in the ROM 803. In S1404, the CPU 802 obtains at least the identifier of the ink bottle 200 whose image has been captured, based on the information held by the second information holder 204. Accordingly, it is possible to trace and obtain the remaining amount of liquid in the same ink bottle 200 as the pre-registered ink bottle 200. Note that the order of the processes S1403 and S1404 may be switched or may be performed simultaneously. In S1405, the CPU 802 associates the identifier of the ink bottle 200 with the remaining amount of liquid in the ink bottle 200 to update the remaining amount of liquid. If the remaining amount of liquid is updated, the CPU 802 transmits the ink bottle record 1000 with the updated remaining amount of liquid to the server 400 in S1406. Then, thereafter, the processing proceeds to S1412.

Next, the case where the server 400 performs the image analysis is explained. In S1407, the CPU 802 of the terminal apparatus 300 obtains a captured image including at least the entire second information holder 204 and ink bottle 200. In S1408, the CPU 802 transmits the obtained captured image of the ink bottle 200 and the identifier of the liquid ejection apparatus 100 obtained by the searching at the time of launching the registration app to the server 400. If the transmission is successful, the server 400 detects the remaining amount of liquid in the ink bottle 200 in S1409. In S1410, the server 400 obtains the identifier of the ink bottle 200 by analyzing the second information holder 204 included in the captured image of the ink bottle 200. Needless to say, it is also possible that manufacturing information other than the identifier of the ink bottle 200 (see FIG. 10) which is held by the second information holder 204 is obtained. Note that the order of the processes S1409 and S1410 may be switched or may be performed simultaneously. In S1411, the server 400 associates the identifier of the ink bottle 200 with the remaining amount of liquid in the ink bottle 200 to update the remaining amount of liquid.

In S1412, the server 400 registers the ink bottle record 1100 with the updated remaining amount of liquid. In S1413, the server 400 transmits the ink bottle record 1100 with the updated remaining amount of liquid to the terminal apparatus 300 and provides a notification that the update of the remaining amount of liquid has been completed. The terminal apparatus 300 obtains the contents of the ink bottle record 1100 from the server 400 and stores the contents in its own storage unit, so as to be thereby capable of displaying image analysis information with the updated remaining amount of liquid and registered server information (see FIG. 9C) on the display unit 810.

In S1414, the terminal apparatus 300 transmits the contents of the ink bottle record 1100 with the updated remaining amount of liquid to the liquid ejection apparatus 100 and provides a notification that the update of the remaining amount of liquid in the server 400 has been completed.

In S1415, the liquid ejection apparatus 100 stores (registers) the updated remaining amount of liquid in the EEPROM 404 as the ink bottle record 500 (see FIG. 5). In the above-described example, in the remaining amount field 504 of the first ink bottle record 501, the remaining amount of liquid is updated from "300 ml" to "150 ml". Accordingly, the liquid ejection apparatus 100 can display the updated remaining amount of liquid on the display unit 150 of the liquid ejection apparatus 100. If the ink bottle record 500 with the updated remaining amount of liquid is stored in the EEPROM 404, the present flow ends. If the present flow is executed, by using the identifier of the pre-registered liquid ejection apparatus 100 as a clue, the identifier of the unregistered ink bottle 200 and the updated remaining amount of liquid are associated with each other and registered in the server 400, so as to be a management target. The above is the outline of the flow of the processing of the entire information processing system.

<<Conclusion>>

With the information processing apparatus according to the present embodiment, it is possible to manage the remaining amount of liquid in a specific liquid container. Further, only by capturing an image of a liquid container with the user, in a case where the remaining amount of liquid in the liquid container falls to a predetermined amount or less, a new liquid container containing the same type of liquid can be delivered to the user. For example, in a case where the remaining amount in the first ink bottle 200C falls to 20% or less, the newly-packaged first ink bottle 200C can be automatically delivered to the user. Furthermore, since the EEPROM 404 of the liquid ejection apparatus 100 also stores the ink bottle record 500 in which the contents of the ink bottle record 1100 are reflected, the liquid ejection apparatus 100 can also be used to manage the remaining amount of liquid in the liquid container.

Further, with the information processing apparatus according to the present embodiment, even a liquid container in a shape to which an IC chip cannot be attached can be a management target. By using the server 400 to manage the remaining amount of liquid in a liquid container that does not include an IC chip, the automatic delivery service of the liquid container can be provided even in a case where the relationship between the liquid container and the liquid ejection apparatus 100 changes from one to one to multiple.

Second Embodiment

Figure 15:
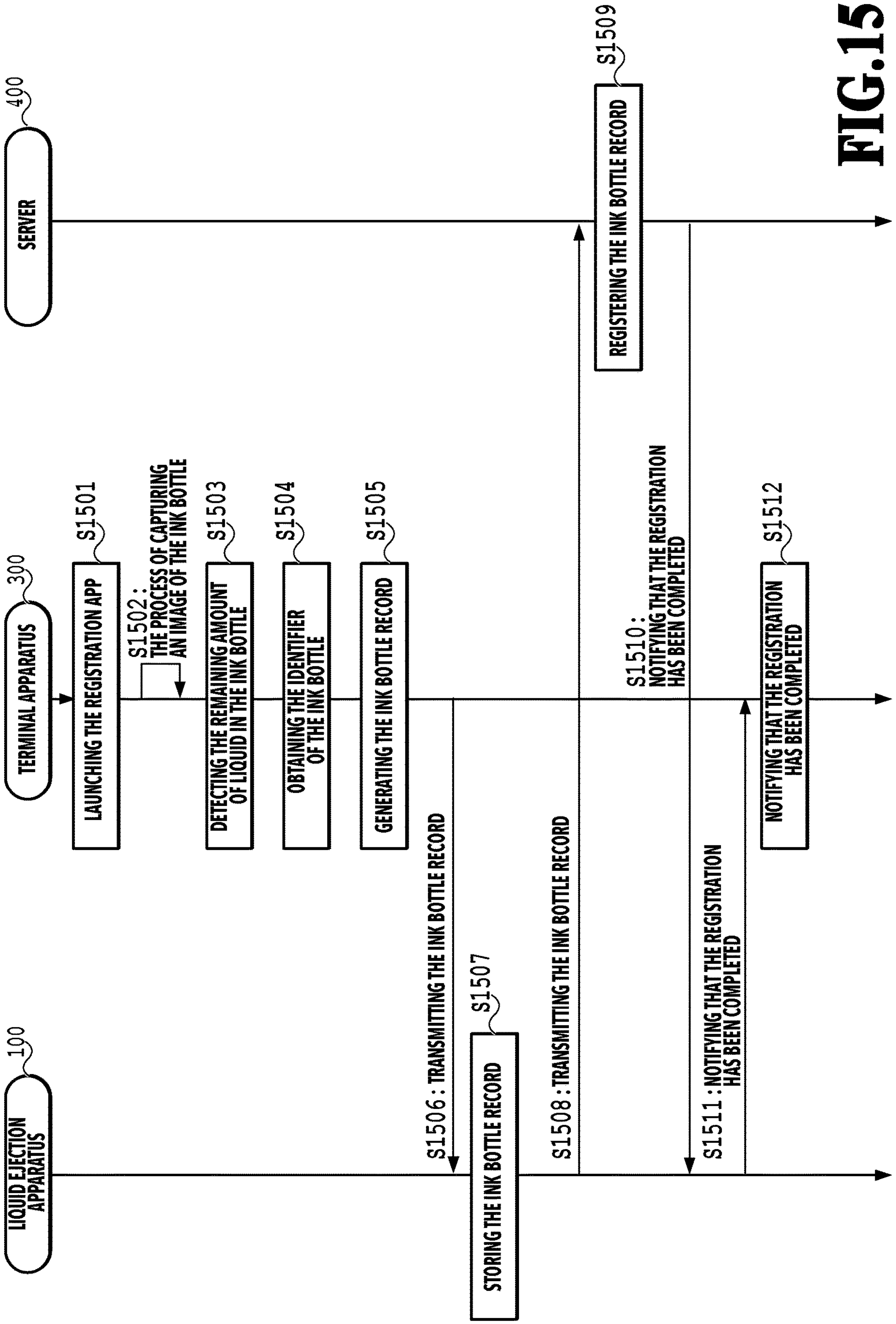
FIG. 15 is a sequence diagram illustrating a flow of processing in the entire information processing system.

Hereinafter, an explanation is given of the second embodiment according to the technique of the present disclosure with reference to the drawings. An object of the present embodiment is to provide an information processing apparatus capable of transmitting the ink bottle record 500 from the liquid ejection apparatus 100 to the server 400. In the first embodiment, if the ink bottle record 1100 is registered or updated, the ink bottle record 1000 is transmitted from the terminal apparatus 300 to the server 400. In contrast, the present embodiment differs from the first embodiment in the aspect that the ink bottle record 500 is transmitted from the liquid ejection apparatus 100 to the server 400. FIG. 15 is a sequence diagram illustrating a processing flow between apparatuses in the present embodiment. The following explanation focuses on the aspects that are different from the first embodiment, and the same or corresponding configurations as those of the first embodiment are assigned with the same signs and the explanations thereof are omitted.

In S1501, as in the first embodiment, the CPU 802 of the terminal apparatus 300 launches the registration app. In S1502, as in the first embodiment, the process of capturing an image of the ink bottle 200 is executed. In S1503, as in the first embodiment, the captured image of the ink bottle 200 is analyzed, and the remaining amount of liquid in the ink bottle 200 is detected. In S1504, as in the first embodiment, the second information holder 204 is read to obtain the identifier of the ink bottle 200. In S1505, as in the first embodiment, the ink bottle record 1000 is generated by associating the remaining amount of liquid in the ink bottle 200 with the identifier.

In S1506, the terminal apparatus 300 according to the present embodiment transmits the ink bottle record 1000 to the liquid ejection apparatus 100. If the transmission is successful, the liquid ejection apparatus 100 according to the present embodiment stores the ink bottle record 500, in which the contents of the ink bottle record 1000 are reflected, in the EEPROM 404 in S1507. In S1508, the liquid ejection apparatus 100 according to the present embodiment transmits the ink bottle record 500 to the server 400.

If the transmission is successful, the server 400 according to the present embodiment registers the ink bottle record 1100, in which the contents of the ink bottle record 500 are reflected, in S1509. In S1510, the liquid ejection apparatus 100 is notified that the registration of the ink bottle record 1100 has been completed. If the notification is successful, the liquid ejection apparatus 100 according to the present embodiment notifies the terminal apparatus 300 in S1511 that the ink bottle record 1100 has been registered in the server 400. If the notification is successful, the terminal apparatus 300 informs the user in S1512 that the ink bottle record 1100 has been registered in the server 400. If the notification is provided, the present flow ends. The above is the outline of the flow of the processing of the entire information processing system according to the present embodiment.

According to the present embodiment, even in a case where the ink bottle record 1000 cannot be transmitted from the terminal apparatus 300 to the server 400, the ink bottle record 1100 can be registered in the server 400 via the liquid ejection apparatus 100 which is pre-registered in the server. Accordingly, for example, it is possible to register the ink bottle record 1100 in the server 400 even in a case where the ink bottle record 1000 cannot be transmitted from the terminal apparatus 300 to the server 400 due to strict security of the server 400.

Third Embodiment

Figure 16:
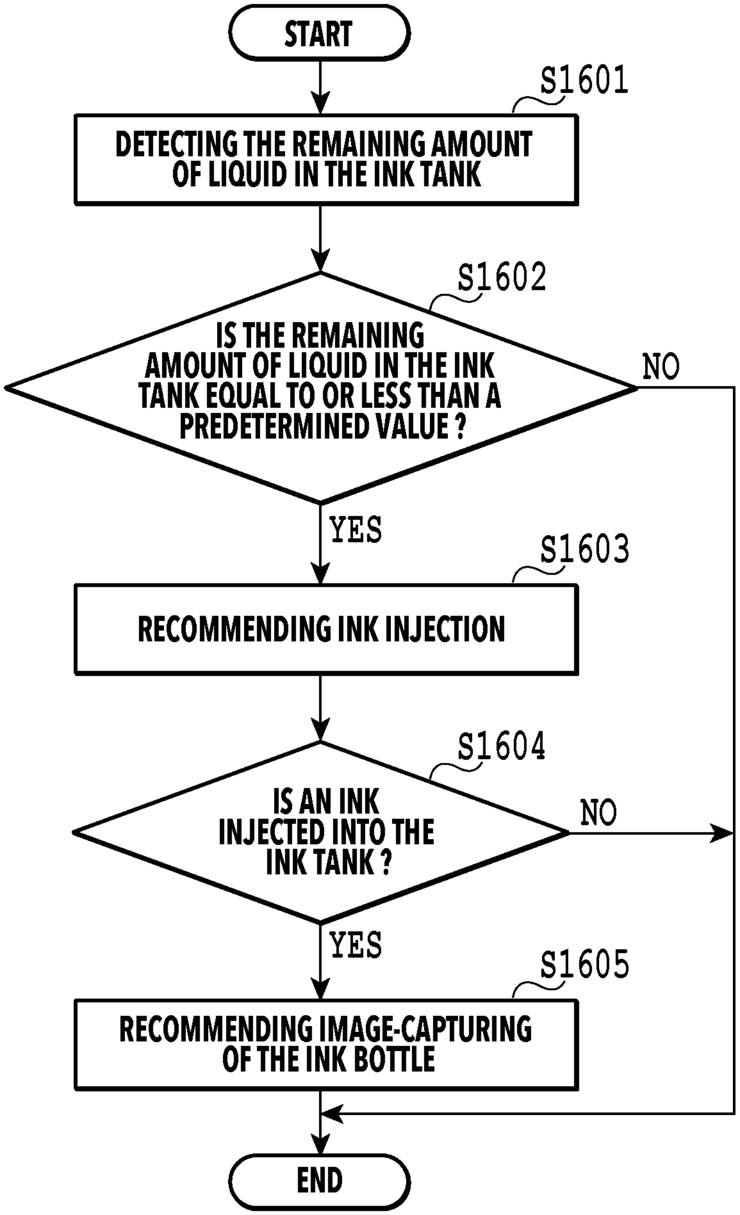
FIG. 16 is a flowchart illustrating a flow of processing performed by the liquid ejection apparatus.

An object of the present embodiment is to provide the liquid ejection apparatus 100 capable of prompting the user to register or update the ink bottle record 1100 in a case where liquid is injected into the ink tank unit 110. The following explanation focuses on the aspects that are different from the first embodiment, and the same or corresponding configurations as those of the first embodiment are assigned with the same signs and the explanations thereof are omitted. FIG. 16 is a flowchart illustrating the flow of processing performed by the CPU 401 of the liquid ejection apparatus 100 according to the present embodiment. Further, the present flow is performed before the processing of S1301 or S1401 is performed.

In S1601, the CPU 401 according to the present embodiment detects the remaining amount of liquid in the ink tank unit 110 of the liquid ejection apparatus 100 using a publicly-known technique. Examples of a method for detecting the remaining amount of liquid in the ink tank unit 110 include a method of using the electrodes (see FIG. 3) of the ink tank unit 110. In S1602, the CPU 401 determines whether the remaining amount of liquid in the ink tank unit 110 is equal to or less than a predetermined value. In a case where the remaining amount of liquid in the ink tank unit 110 is equal to or less than the predetermined value, the processing proceeds to S1603. On the other hand, in a case where the remaining amount of liquid in the ink tank unit 110 is greater than the predetermined value, the CPU 401 ends the present flow. In S1603, the first recommendation screen 151 (see FIG. 17A) is displayed on the display unit 150.

Figure 17B:
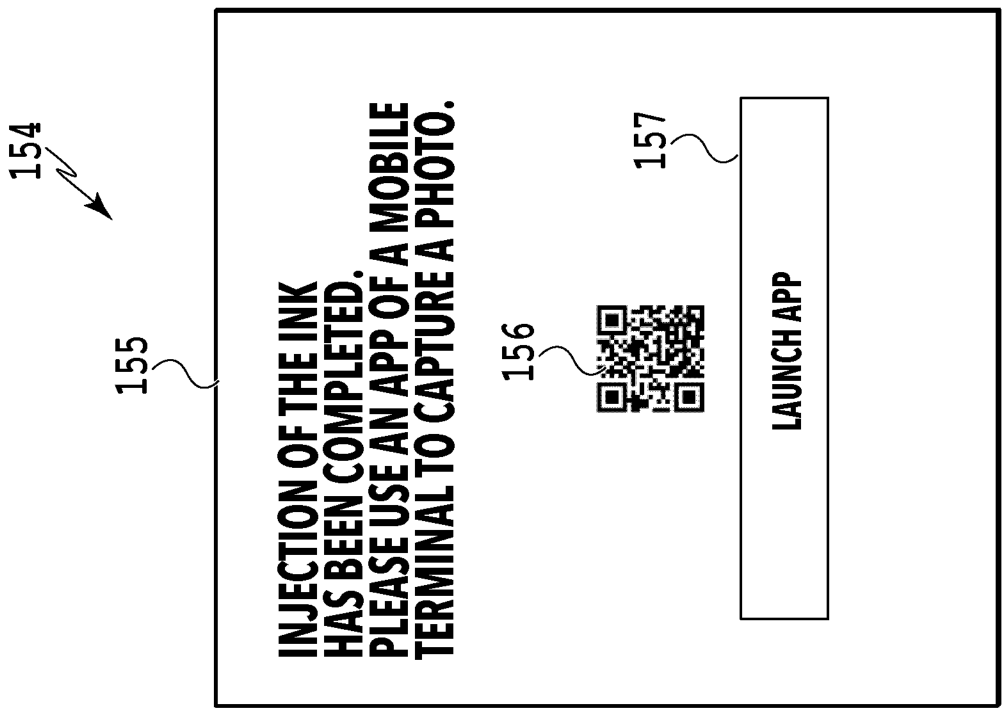
FIG. 17A and FIG. 17B are diagrams illustrating examples of a screen displayed on the display unit.
Figure 17A:
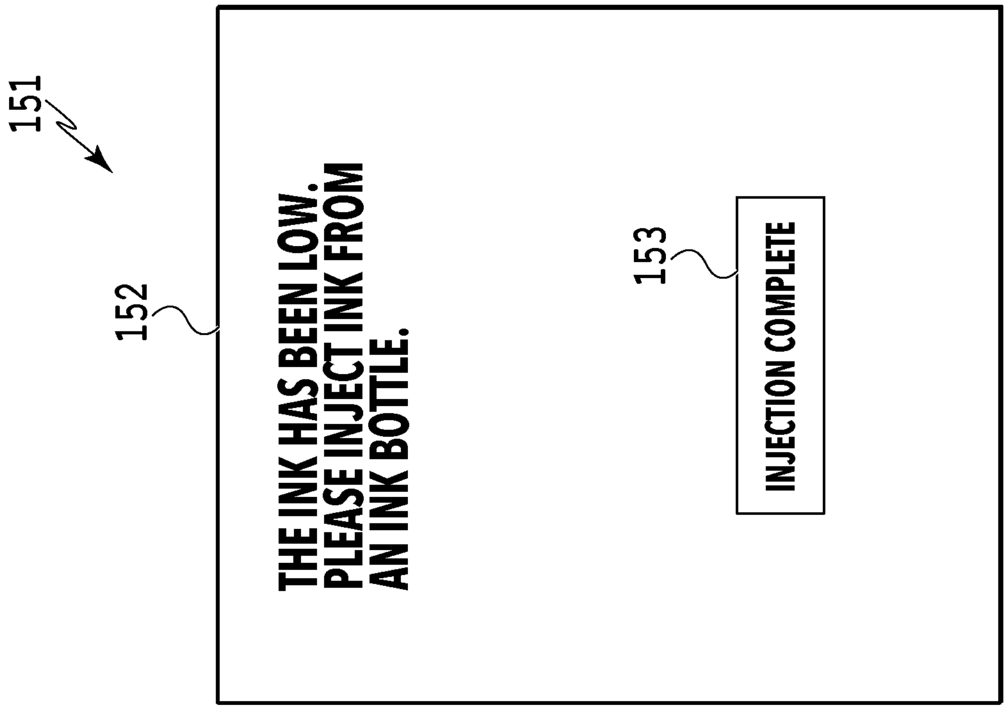

FIG. 17A and FIG. 17B are diagrams illustrating examples of a screen displayed on the display unit 150 of the liquid ejection apparatus 100 according to the present embodiment. In FIG. 17A, an example of the first recommendation screen 151 that recommends liquid injection for the user is illustrated. In the example illustrated in FIG. 17A, a message prompting the user to inject liquid is displayed in the first display area 152 of the first recommendation screen 151. Further, the "INJECTION COMPLETE" button 153 is displayed below the message. If the user presses the "INJECTION COMPLETE" button 153, the screen transitions to the second recommendation screen 154 (see FIG. 17B). In FIG. 17B, an example of the second recommendation screen 154 prompting the user to capture an image of the ink bottle 200 in the case where pressing of the "INJECTION COMPLETE" button 153 has been detected is illustrated. In the example illustrated in FIG. 17B, a message prompting image-capturing of the ink bottle 200 is displayed in the second display area 155 of the second recommendation screen 154. Below the message, the third information holder 156 which holds information for launching the registration app is displayed. If the user uses the terminal apparatus 300 to read the third information holder 156, the CPU 802 of the terminal apparatus 300 starts the above-described processing from S1301 or S1401. Note that, in a case where the ink bottle record 1100 is not registered in the server 400, the processing from S1301 is started. On the other hand, in a case where the ink bottle record 1100 is registered in the server 400 and the remaining amount of liquid in the ink bottle 200 is to be updated, the processing from S1401 is started.

Further, the "LAUNCH APP" button 157 may be displayed in the second display area 155. It is also possible that, upon detecting that the "LAUNCH APP" button 157 is pressed, the CPU 401 transmits a request for launching the registration app to the terminal apparatus 300. It is also possible that, upon receiving the request, the CPU 802 of the terminal apparatus 300 starts the above-described processing from S1301 or S1401.

Returning to FIG. 16, the explanation of the present flow is continued. In S1604, the CPU 401 of the liquid ejection apparatus 100 determines whether a liquid is injected into the ink tank unit 110. In a case where the liquid is injected into the ink tank unit 110, the processing proceeds to S1605. On the other hand, in a case where the liquid is not injected into the ink tank unit 110, the present flow ends. For example, in a case where the CPU 401 detects that the "INJECTION COMPLETE" button 153 displayed on the first recommendation screen 151 is pressed, the CPU 401 determines that the liquid is injected into the ink tank unit 110.

This is because, in a case where the CPU 401 detects that the "INJECTION COMPLETE" button 153 is pressed, there is a high possibility that the user has injected liquid into the ink tank unit 110. In S1605, the CPU 401 displays the second recommendation screen 154 on the display unit 150. If the second recommendation screen 154 is displayed, the present flow ends. The above is the outline of the flow of the processing performed by the CPU 401 according to the present embodiment.

If the user reads the third information holder 156 included in the second recommendation screen 154 using the terminal apparatus 300, the CPU 802 of the terminal apparatus 300 launches the registration app to execute the above-described processing from S1301 or S1401. Hereinafter, the processing contents of S1301 (or S1401 in a case of updating the remaining amount of liquid) performed by the CPU 802 according to the present embodiment are explained.

First, the explanation is given on a premise that the user uses the terminal apparatus 300 to read the third information holder 156. Based on the information held by the third information holder 156, the CPU 802 according to the present embodiment causes the display unit 810 to display a pop-up screen prompting image-capturing of the second information holder 204 of the ink bottle 200 on the display unit 810. For example, as with the second recommendation screen 154, a message prompting the user to capture an image of the ink bottle 200 is displayed on the pop-up screen. Normally, the user who sees the pop-up screen presses the pop-up screen. If the CPU 802 detects pressing of the pop-up screen, the image-capturing unit 811 is launched. That is, if the user presses the pop-up screen, an image of the ink bottle 200 can be captured. The flow after the process of executing the image-capturing of the ink bottle 200 is as described above.

Subsequently, the explanation is given on a premise that the user presses the "LAUNCH APP" button 157. In this case, upon detecting that the "LAUNCH APP" button 157 is pressed, the CPU 401 of the liquid ejection apparatus 100 transmits a request for launching the registration app to the terminal apparatus 300. Upon receiving the launching request, the terminal apparatus 300 displays the above-described pop-up screen on the display unit 810. If the user presses the pop-up screen, the image-capturing unit 811 is launched and an image of the ink bottle 200 can be captured.

According to the present embodiment, it is possible to prompt the user to capture an image of the ink bottle 200 in a case where liquid is injected into the ink tank unit 110. That is, according to the present embodiment, it is possible to prompt the user to register or update the ink bottle record 1100 in a case where liquid is injected into the ink tank unit 110.

Other Embodiment

In the first embodiment, the ink bottle record 1100 is registered in the server 400 in a list format. On the other hand, it is also possible that the ink bottle record 1100 is registered in the server 400 in a format including the captured image of the ink bottle 200.

In the first embodiment, the destination of the server 400 is held in first information holder 160. As another example, it is also possible that the destination of the server 400 is set in advance in the registration app. In that case, a destination of a management server different from the server 400 may be also set. Accordingly, the ink bottle record of the ink bottle 200 can be managed using a management server that provides a service different from the service provided by the server 400.

Although, in the first embodiment, the registration app is launched by the user pressing an icon, it is also possible that the second information holder 204 holds information for launching the registration app and the registration app is launched by reading the second information holder 204. Accordingly, the user simply captures an image of the ink bottle 200 using the terminal apparatus 300 to launch the registration app and can transmit the ink bottle record 1000 to the server 400.

Although, in the first embodiment, a two-dimensional code is used as the second information holder 204, it is also possible to use a one-dimensional code (for example, a bar code, etc.) which holds the identifier of the ink bottle 200, instead of the two-dimensional code.

Although, in the first embodiment, the terminal apparatus 300 sends the captured image of the ink bottle 200 as it is in S1308, it is also possible to send the data after image analysis. For example, the terminal apparatus 300 may transmit data including the remaining amount of liquid, which is obtained by performing image analysis on the captured image of the ink bottle 200, to the server 400.

It is also possible that the automatic delivery of the ink bottle 200 is automatically performed based on the consumption amount of liquid. Specifically, the capacity of the ink bottle 200 (that is, the amount of liquid contained in the newly-packaged ink bottle 200) is obtained in advance by reading the second information holder 204. Accordingly, in a case where the ratio of the remaining amount of liquid in the ink bottle 200 falls to a predetermined value or less, the ink bottle 200 may be automatically delivered to the user. For example, as illustrated in FIG. 6B, in a case where the remaining amount of the third ink bottle 200Y with a capacity of 300 ml falls 20% or less, a newly-packaged third ink bottle 200Y may be automatically delivered to the user who has used the third ink bottle 200Y.

In S1604 described above, the CPU 401 determines that liquid has been injected into the ink tank unit 110 in a case where the pressing of the "INJECTION COMPLETE" button 153 is detected. As another example, the CPU 401 may determine that liquid has been injected in a case of detecting an increase in the remaining amount of liquid via electrodes of the ink tank unit 110. As one another example, the CPU 401 may determine that liquid has been injected into the ink tank unit 110 in a case of detecting that the cover 111 is opened and closed. This is because, in a case where the cover 111 is opened and closed, there is a high possibility that the cover 111 is opened by the user and liquid is injected into the ink tank unit 110.

Although, in the third embodiment, the first recommendation screen 151 and the second recommendation screen 154 are displayed on the display unit 150 of the liquid ejection apparatus 100, it is also possible that the first recommendation screen 151 and the second recommendation screen 154 are displayed on the display unit 810 of the terminal apparatus 300.

Although, in the first embodiment, a multi-function peripheral (printer) with a scanner function is taken as an example of the liquid ejection apparatus 100, the liquid ejection apparatus 100 is not limited to the example. As another example, a copier, facsimile, and printer without a scanner function may be used.

The techniques of the present disclosure can also be implemented by processing of supplying a program for implementing one or more functions of the above-described embodiments to a system or an apparatus via a network or a storage medium, so that one or more processors in a computer of the system or the apparatus read out and execute the program. Further, implementation by use of a circuit (for example, an ASIC) for implementing one or more functions is also possible.

With the information processing apparatus according to the present disclosure, it is possible to manage the remaining amount of liquid of a specific liquid container.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-183632, filed Nov. 10, 2021, which is hereby incorporated by reference herein in its entirety.

What is claimed is:

1. An information processing system including an information processing apparatus, a server system, and a printer, wherein the information processing apparatus and the server system are connected via a network, wherein the information processing apparatus comprises at least one memory and at least one processor which function as a plurality of units comprising:

(1) an image obtainment unit configured to obtain a captured image of an ink container containing ink to be used in printing, the captured image having been acquired by capturing an image using an image-capturing unit;

(2) a first identifier obtainment unit configured to obtain a first identifier for uniquely identifying the ink container from the captured image;

(3) a detection unit configured to detect a remaining amount of ink in the ink container by analyzing the captured image; and (4) a transmission unit configured to transmit the first identifier and the remaining amount of ink to the server system via the network, wherein the server system stores the first identifier so as to be associated with the remaining amount of ink, wherein the server system manages the remaining amount of ink in the ink container and provides a service in which a new ink container is automatically delivered to a user in a case where the remaining amount is a predetermined value or less, and wherein the printer comprises:

(a) a printing unit configured to discharge ink for the printing;

(b) an ink tank to store ink to be supplied to the printing unit;

(c) at least one memory and at least one processor which function as a display control unit configured to, after the remaining amount of ink in the ink tank is equal to or less than a predetermined value, in response to fulfillment of a predetermined condition corresponding to injection of ink from the ink container into the ink tank, display a specific indication that prompts the user to capture the ink container with the image-capturing unit.

2. The information processing system according to claim 1, wherein the first identifier is associated with the remaining amount of ink.

3. The information processing system according to claim 2, wherein the captured image is further associated with the first identifier and the remaining amount of ink.

4. The information processing system according to claim 2, wherein the information processing apparatus further obtains a second identifier for uniquely identifying the printer, and wherein the second identifier is further associated with the first identifier and the remaining amount of ink.

5. The information processing system according to claim 1, wherein the information processing apparatus obtains the first identifier and the remaining amount of ink updated by the server system, transmitted from the server system, and wherein the obtained first identifier and the obtained remaining amount of ink updated by the server system are stored.

6. The information processing system according to claim 1, wherein the ink container includes a first information holder configured to hold information including the first identifier.

7. The information processing system according to claim 6, wherein the first information holder is a two-dimensional code.

8. The information processing system according to claim 1, wherein a serial ID for uniquely identifying the ink container is obtained from the captured image.

9. The information processing system according to claim 1, wherein the transmission unit further transmits the captured image, and wherein the server system further stores the captured image so as to be associated with the first identifier and the remaining amount of ink.

10. The information processing system according to claim 1, wherein the at least one memory of the information processing apparatus and the at least one processor of the information processing apparatus further function as a display control unit configured to perform control so as to display guidance prompting image-capturing in such a way that the first information holder and a remaining amount of ink in the ink container can be seen in a case where image-capturing is performed on the ink container by the image-capturing unit to obtain the captured image.

11. The information processing system according to claim 1, wherein the at least one memory of the information processing apparatus and the at least one processor of the information processing apparatus further function as a display control unit configured to perform control so as to display guidance prompting simultaneous image-capturing of the first information holder included in the ink container and a second identifier for uniquely identifying an ink ejection apparatus included in the ink ejection apparatus in a case where image-capturing is performed on the ink container by the image-capturing unit to obtain the captured image.

12. The information processing system according to claim 1, wherein the predetermined condition is a condition that there is a user operation indicating that ink injection is complete.

13. The information processing system according to claim 1, wherein the display control unit displays, together with the specific indication, a display item for activating application software that operates on the information processing apparatus and that has the functions (1) through (4).

14. The information processing system according to claim 13, wherein the display item is a two-dimensional code that holds information for activating the application software.

15. The information processing system according to claim 13, wherein the display item is a button that accepts a user operation, and wherein in response to the button being operated, the printer sends a request to the information processing apparatus to activate the application software.

16. The information processing system according to claim 1, wherein the specific indication comprises a recommendation screen including a message instructing the user to capture the ink container with the image-capturing unit, wherein the predetermined condition is a predetermined condition corresponding to completion of injection of ink from the ink container into the ink tank, and wherein the display control unit further displays a display item that effects launching of application software on the information processing apparatus.

17. The information processing system according to claim 16, wherein the display item is a two-dimensional code.

18. The information processing system according to claim 16, wherein the display item is a button, displayed on a screen, that accepts a user operation.

19. An information processing system including an information processing apparatus, a server system, and a printer, wherein the information processing apparatus and the server system are connected via a network, wherein the information processing apparatus transmits a captured image of an ink container containing ink to be used in printing, the captured image having been acquired by capturing an image using an image-capturing unit, wherein the server system comprises at least one memory and at least one processor which function as a plurality of units comprising:

(1) a first identifier obtainment unit configured to obtain a first identifier for uniquely identifying the ink container from the captured image;

(2) a detection unit configured to detect a remaining amount of ink in the ink container by analyzing the captured image;

(3) a storage unit configured to store the first identifier so as to be associated with the remaining amount of ink; and (4) a providing unit configured to provide a service in which a new ink container is automatically delivered to a user in a case where the remaining amount of ink stored in the storage unit is a predetermined value or less, and wherein the printer comprises:

(a) a printing unit configured to discharge ink for the printing;

(b) an ink tank to store ink to be supplied to the printing unit;

(c) at least one memory and at least one processor which function as a display control unit configured to, after the remaining amount of ink in the ink tank is equal to or less than a predetermined value, in response to fulfillment of a predetermined condition corresponding to injection of ink from the ink container into the ink tank, display a specific indication that prompts the user to capture the ink container with the image-capturing unit.

20. The information processing system according to claim 19, wherein the server system further stores the captured image so as to be associated with the first identifier and the remaining amount of ink.

21. The information processing system according to claim 19, wherein the first identifier is associated with the remaining amount of ink.

22. The information processing system according to claim 19, wherein the captured image is further associated with the first identifier and the remaining amount of ink.

23. The information processing system according to claim 19, wherein the information processing apparatus obtains the first identifier and the remaining amount of ink updated by the server system, transmitted from the server system, and wherein the obtained first identifier and the remaining amount of ink updated by the server system are stored.

24. The information processing system according to claim 19, wherein the ink container includes a first information holder configured to hold information including the first identifier.

25. The information processing system according to claim 24, wherein the first information holder is a two-dimensional code.

26. The information processing system according to claim 19, wherein a serial ID for uniquely identifying the ink container is obtained from the captured image as the first identifier.

27. The information processing system according to claim 19, wherein the information processing apparatus further obtains a second identifier for uniquely identifying the printer, and wherein the second identifier is further associated with the first identifier and the remaining amount of ink.

28. The information processing system according to claim 19, wherein the predetermined condition is a condition that there is a user operation indicating that ink injection is complete.

29. The information processing system according to claim 19, wherein the display control unit displays, together with the specific indication, a display item for activating application software that operates on the information processing apparatus to effect the transmission of the captured image.

30. The information processing system according to claim 29, wherein the display item is a two-dimensional code that holds information for activating the application software.

31. The information processing system according to claim 29, wherein the display item is a button that accepts a user operation, and wherein in response to the button being operated, the printer sends a request to the information processing apparatus to activate the application software.

* * * * *